(12) United States Patent
Kraljic et al.

(10) Patent No.: US 10,698,585 B2
(45) Date of Patent: Jun. 30, 2020

(54) VIRTUAL ASSISTANT DEVELOPMENT SYSTEM

(71) Applicant: Nuance Communications, Inc., Burlington, MA (US)

(72) Inventors: Tanya Kraljic, Ramsey, NJ (US); Max Copperman, Santa Cruz, CA (US); Susan Dawnstarr Daniel, Palo Alto, CA (US); Tiago G. Cabaco, Hayward, CA (US)

(73) Assignee: Nuance Communications, Inc., Burlington, MA (US)

( * ) Notice: Subject to any disclaimer, the term of this patent is extended or adjusted under 35 U.S.C. 154(b) by 417 days.

(21) Appl. No.: 14/473,073

(22) Filed: Aug. 29, 2014

(65) Prior Publication Data

US 2016/0062604 A1    Mar. 3, 2016

(51) Int. Cl.
*G06F 3/0482* (2013.01)
*G06F 3/0483* (2013.01)
(Continued)

(52) U.S. Cl.
CPC ........ *G06F 3/04842* (2013.01); *G06F 3/0482* (2013.01); *G06F 3/0483* (2013.01); *G06F 3/04847* (2013.01); *G06F 16/3329* (2019.01); *G10L 15/1815* (2013.01); *G10L 2015/221* (2013.01)

(58) Field of Classification Search
CPC ..... G10L 15/22; G10L 15/18; G10L 15/1822; G10L 17/22; G10L 15/1815; G10L 15/183; G10L 17/04; G06F 3/167; G06F 9/4446; G06F 17/28; G06F 17/30654; G06F 3/04886; G06N 5/02
See application file for complete search history.

(56) References Cited

U.S. PATENT DOCUMENTS 6,188,976 B1   2/2001 Ramaswamy et al.
8,478,584 B1   7/2013 Grove
(Continued)

OTHER PUBLICATIONS

Mar. 14, 2016—(PCT) International Search Report and Written Opinion—App PCT/US2015/047122.
(Continued)

*Primary Examiner* — Sang H Kim
(74) *Attorney, Agent, or Firm* — Brian J. Colandreo; Michael T. Abramson; Holland & Knight LLP

(57) ABSTRACT

In accordance with aspects of the disclosure, a computing device may provide a user interface for developing an interactive natural-language response system, which may include a virtual assistant. A user may interact with a system using spoken, written (e.g., text), or other input methods. The user interface may allow a user to associate sentences with intents, tag words within the sentences with concepts, and construct a grammar using the associated intents and tagged concepts. The system may use the grammar for automatically predictively associating sentences with intents and words with concepts. The system may display in the foam of a chat transcript a single branch of a tree of a discussion between the virtual assistant and a user. The user interface may graphically display variable values to assist a user to test system responses under different simulated conditions.

8 Claims, 25 Drawing Sheets

(51) Int. Cl.
  *G06F 3/0484* (2013.01)
  *G10L 15/18* (2013.01)
  *G06F 16/332* (2019.01)
  *G10L 15/22* (2006.01)

(56) References Cited

U.S. PATENT DOCUMENTS

| | | | |
|---|---|---|---|
| 2003/0212543 A1* | 11/2003 | Epstein | G06F 17/271 |
| | | | 704/9 |
| 2003/0216905 A1 | 11/2003 | Chelba et al. | |
| 2007/0244847 A1* | 10/2007 | Au | G06F 17/2785 |
| | | | 706/55 |
| 2009/0240683 A1* | 9/2009 | Lazier | G06F 16/951 |
| 2012/0016678 A1* | 1/2012 | Gruber | G06F 17/3087 |
| | | | 704/275 |
| 2012/0221502 A1* | 8/2012 | Jerram | G06Q 30/02 |
| | | | 706/46 |
| 2013/0268260 A1* | 10/2013 | Lundberg | G06F 17/28 |
| | | | 704/8 |
| 2013/0283168 A1* | 10/2013 | Brown | G06F 3/165 |
| | | | 715/728 |
| 2014/0244266 A1* | 8/2014 | Brown | G10L 15/22 |
| | | | 704/275 |
| 2014/0337048 A1* | 11/2014 | Brown | G06F 19/345 |
| | | | 705/2 |
| 2014/0337814 A1* | 11/2014 | Kalns | G06F 8/00 |
| | | | 717/100 |
| 2014/0365885 A1* | 12/2014 | Carson | G06F 3/167 |
| | | | 715/708 |
| 2015/0142704 A1* | 5/2015 | London | G06N 5/04 |
| | | | 706/11 |
| 2015/0186156 A1* | 7/2015 | Brown | G06F 3/04817 |
| | | | 715/706 |
| 2016/0104481 A1* | 4/2016 | Ehsani | G10L 15/193 |
| | | | 704/9 |

OTHER PUBLICATIONS

Mar. 30, 2009—Dinarelli, Marco et al., "Annotating Spoken Dialogs: from Speech Segments to Dialog Acts and Frame Semantics," Proceedings of EACL 2009 Workshop on Semantic Representation of Spoken Language—SRSL 2009, pp. 34-41.

Jan. 5, 2016—(PCT) Invitation to Pay Fees and Communication Relating to the Search Results of the Partial International Search—App PCT/US2015/047122.

Communication pursuant to Article 94(3) EPC issued in EP Application No. 15760575.9 dated Dec. 6, 2018.

* cited by examiner

VIRTUAL ASSISTANT DEVELOPMENT SYSTEM

TECHNICAL FIELD

This disclosure relates to natural-language understanding. Specifically, this disclosure relates to systems for developing natural-language systems.

BACKGROUND

Natural-language systems are utilized to manipulate data based on natural-language input (e.g., words spoken or written by a user). Natural-language systems conventionally are difficult to develop, requiring, for example, extensive knowledge of the science behind speech recognition and text processing. The development of technology has increased the ubiquity of and demand for natural-language systems in everything from smartphones to televisions. There will always be a need for improved methods and systems for developing natural-language systems.

SUMMARY

The following presents a simplified summary in order to provide a basic understanding of some aspects of the disclosure. This summary is not an extensive overview of the disclosure. It is intended neither to identify key or critical elements of the disclosure nor to delineate the scope of the disclosure. The following summary merely presents some concepts of the disclosure in a simplified form as a prelude to the description below.

In accordance with one or more embodiments, a computing device may provide a user interface that includes a first display area that displays a list of one or more intents, where each intent of the one or more intents is associated with a process that can be performed by a language-processing system. The user interface may include a second display area that displays a list of request strings, where the list of request strings is automatically updated, responsive to a selection of an intent from the list of one or more intents in the first display area, to include one or more request strings associated with the selected intent. The user interface may include a third display area that displays one or more concept tags respectively corresponding to one or more concepts respectively associated with one or more associated words in a request string of the list of request strings in the second display area, and receives input associating one or more unassociated words in the request string with one or more concepts. The one or more concepts may be associated with the selected intent. The request string of the list of request strings in the second display area may be associated with the selected intent.

In some embodiments, the user interface may include a fourth display area that receives a request string, displays an intent associated with the request string, and displays one or more concept tags respectively associated with one or more concepts respectively associated with one or more words in the request string. The one or more concepts may be associated with the intent associated with the request string.

In some embodiments, the computing device may include a speech recognizer that receives the spoken input, recognizes the words in the spoken input, and outputs the recognized words as a text string. The user interface may include a fourth display area that displays the text string received from the speech recognizer. In some embodiments, the fourth display area may allow a user to correct a transcription (e.g., the text string) received from the speech recognizer. In some embodiments, the computing device may receive a request string as text, an image, video, or some other form of input.

In some embodiments, the computing device may receive a new request string not currently in the list of request strings, suggest an intent from the list of one or more intents to associate with the new request string, suggest one or more concept tags respectively corresponding to one or more concepts to respectively associate with one or more words in the new request string, where the one or more concepts may be associated with the suggested intent, and display the new request string, the suggested intent, and the suggested one or more concept tags in the user interface. In some embodiments, the computing device may generate a grammar using the request strings, the one or more intents, and the one or more concepts. The grammar may be capable of recognizing the intent matched by a request string and the concepts contained in a request string. Suggesting the intent of the list of one or more intents to associate with the new request string may be based on the grammar. Suggesting the one or more concept tags respectively corresponding to the one or more concepts to respectively associate with the one or more words in the new request string may be based on the grammar.

In some embodiments, a computing device may receive a tree including a plurality of discussions between a virtual assistant and a user, each discussion being represented by one path through the tree, each path comprising one or more nodes, each node of the one or more nodes associated with at least one of a plurality of potential user responses that the user may give the virtual assistant or at least one of a plurality of potential system responses that the virtual assistant may give the user, generate a display of a transcript of a single discussion path through the tree, the transcript of the single discussion path comprising a series of interactions between the virtual assistant and the user, where each interaction of the series of interactions may be associated with a respective node of the one or more nodes. Each node of the one or more nodes may be associated with a plurality of next nodes after the selected node by a branch between the node and each next node. The computing device may receive a selection of a node of the one or more nodes, generate a display of the plurality of potential user responses or potential system responses respectively associated with a plurality of next nodes after the selected node, receive a selection of a user response or system response of the displayed plurality of potential user responses or potential system responses, update the display of the transcript to show the selected user response or system response, and update the display of the transcript to show the one or more user responses or system responses of the plurality of potential user responses or potential system responses, where the one or more user responses or system responses is associated with a next node of the plurality of next nodes after the selected node.

In some embodiments, a node may be associated with an intent such that a plurality of potential user responses associated with the node corresponds to the set of request strings associated with the intent. In some embodiments, the plurality of potential user responses associated with the node may correspond to a set of spoken or written user inputs that are recognized as matching the associated intent by the grammar generated using the request strings, the one or more intents, and the one or more concepts.

In some embodiments, a concept may be associated with a node, and a distinct value of that concept may be associated with each next node after the selected node. The next node whose system response is displayed in the transcript may be the node associated with the concept value contained in the selected user response of the selected node. For example, at each choice-point in the tree, the choice that is made may depend on a concept value in the user response. In some embodiments, the concept value associated with a next node may be a concept value recognized (e.g., by the grammar generated using the request strings, the one or more intents, and the one or more concepts) as matching a phrase in the plurality of potential user responses associated with the node.

In some embodiments, a computing device may display a testing interface including a representation of a hypothetical dialog between a user and the virtual assistant, where the testing interface may use a tree of discussion branches (e.g., as described above) in determining questions and responses to give the user in the hypothetical dialog. In some embodiments, the user may enter a user response at an interaction point associated with a node. The next node whose system response is displayed in the testing interface may be the node associated with a concept value recognized as matching a phrase in the user response.

In some embodiments, the testing interface may including a graphical representation of a plurality of variables associated with a particular function of an virtual assistant, the particular function being associated with an intent and each variable of the plurality of variables corresponding to a concept associated with the intent, receive input comprising a value for at least one of the concepts associated with the intent, set the at least one variable to the value from the input, and display a visual representation of a hypothetical dialog between a user and the virtual assistant. The testing interface may use the value of a concept to identify the next node of a node associated with concept in the branch, and may suppress the display string for both the node and its next node. For example, the hypothetical dialog may skip over the system responses (e.g., questions) and user responses (e.g., answers) for known values. Alternatively or additionally, if the answer has been specified as a value in the testing interface, the question may not be asked in the dialog.

Other details and features will be described in the sections that follow.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
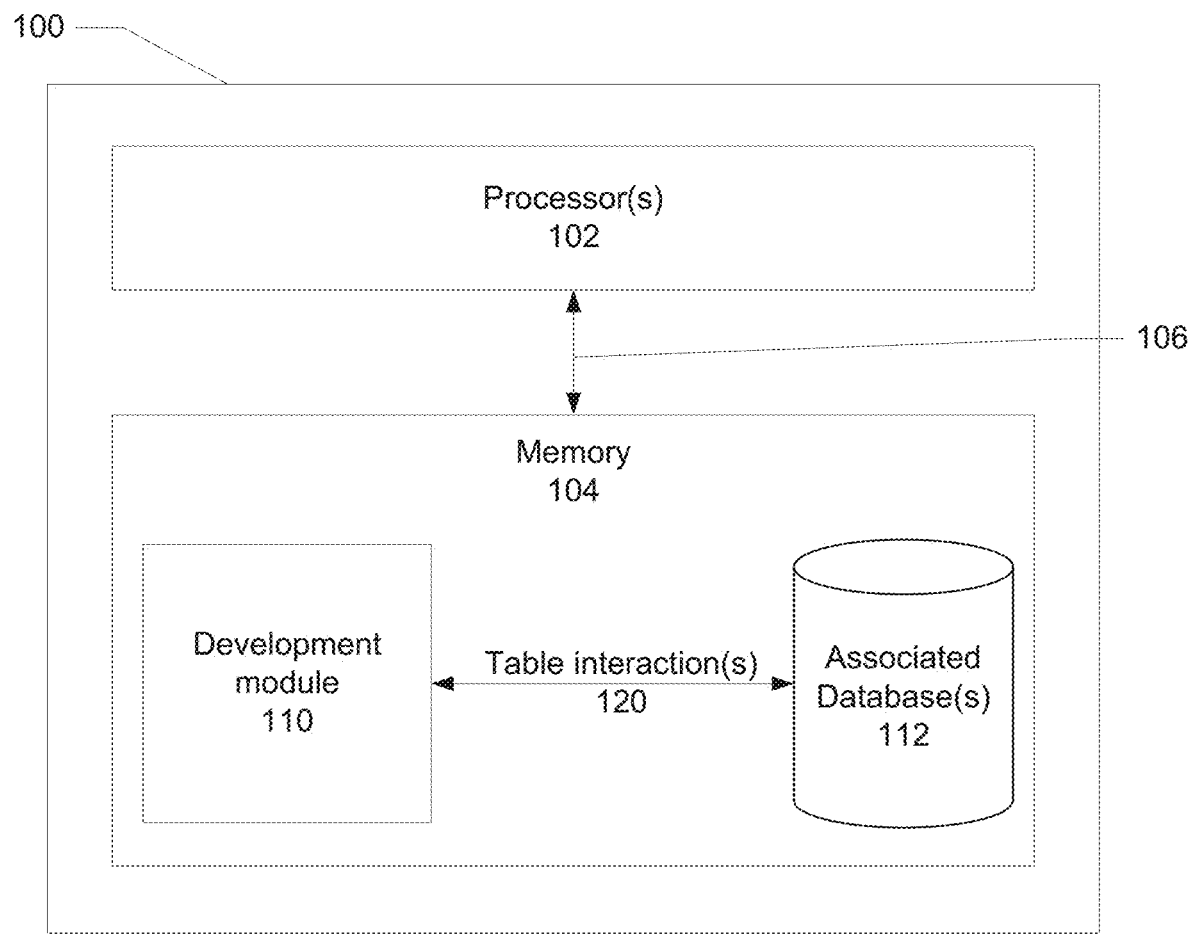
FIG. 1 depicts an illustrative computing device for a natural-language development system in accordance with one or more example embodiments.

FIG. 1 depicts an illustrative computing device for a natural-language development system in accordance with one or more example embodiments. Referring to FIG. 1, computing device 100 may be any type of computing device (or combination thereof) capable of performing the functions described herein. For example, computing device 100 may be a server, server blade, desktop computer, laptop computer, tablet computer, smart phone, mobile device, or the like. Computing device 100 may include processor(s) 102 and memory 104. Data bus 106 may interconnect processor(s) 102 and memory 104, and may support intercommunication between processor(s) 102 and memory 104.

Memory 104 may include one or more program modules comprising executable instructions that when executed by processor(s) 102 cause (or configure) computing device 100 to perform one or more functions described herein. For example, memory 104 may include development module 110. Development module 110 may include executable instructions associated with creating a natural-language system (e.g., a virtual assistant). Development module 110 may include or be in communication with one or more other modules. For example, development module 110 may include or be in communication with an NLU module for disassembling and/or parsing natural-language input (e.g., utterances spoken by a user of computing device 100), and communicating data representative of the natural-language input (or portions thereof) to one or more other modules, including development module 110. Development module 110 may include or be in communication with one or more other modules, including modules for generating prompts (e.g., audio prompts), processing responses to the prompts (e.g., data received from the NLU module), and/or manipulating data (e.g., underlying application data) based on the responses.

Development module 110 may include one or more associated user interfaces, which may allow a user to interact with one or more portions of one or more applications associated with development module 110 for developing a natural-language system. For example, a user interface may include an NLU/grammar construction portion, a chat dialog development portion, and a testing portion.

In some embodiments, memory 104 may include associated database(s) 112. Associated database(s) 112 may include one or more data structures (e.g., tables) storing information associated with development module 110 (or one or more applications associated therewith). Different elements of an application associated with development module 110 may use or store the same associated database(s) 112. In some embodiments, data created, entered, updated, or deleted using one portion of an application associated with development module 110 may be stored in the associated database(s) 112, and therefore changes to the data may then be accessible to a different portion of the application associated with development module 110.

Figure 2:
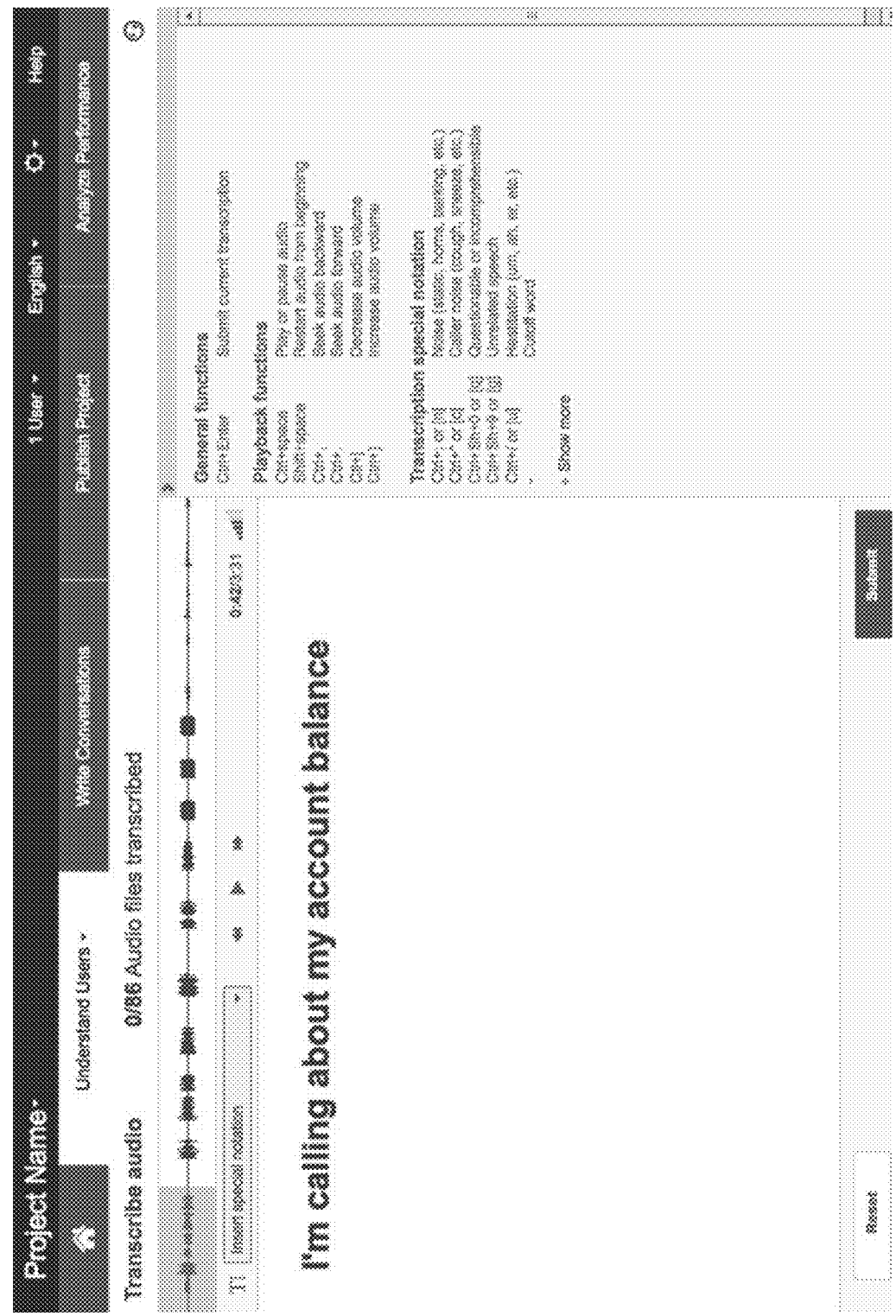
FIG. 2 depicts an illustrative screen of a user interface for importing recorded user utterances for use in a natural-language development system in accordance with one or more example embodiments.

FIG. 2 depicts an illustrative embodiment of a natural-language development system user interface. The natural-language development system may include different features, as described herein, which may be accessible by different tabs in the user interface 200 that correspond to the different features of the natural-language development system. For example, the natural-language development system may allow a user to teach the system how to understand or communicate with users (e.g., "understand users"), to develop dialogs between a natural-language system and a user (e.g., "write conversations"), or to perform additional features (e.g., "publish project," "analyze performance").

For the natural-language development system to learn how to understand or communicate with users, the system may accept an input of a series of test or sample audio files (e.g., recordings of users talking, which may simulate voice commands given to a natural-language system). The system may process an audio file, including transcribing, categorizing, indexing, filing, or performing additional operations on the audio file. As illustrated in FIG. 2, the system may transcribe the audio file. The user may be presented with a transcription of the audio file, and may correct, confirm, or reject the automatic transcription.

The system may accept multiple commands for processing the current audio file. For example, the system may allow a user to submit the current transcription, play or pause audio, restart audio from the beginning, seek audio backward, seek audio forward, decrease audio volume, increase audio volume, etc. The system may allow the user to annotate the current audio file. For example, the system may allow the user to correct the current transcription. In another example, the system may allow the user to add a special notation to the transcription of the current audio file. For example, a user may make a special notation to the transcription of the current audio file of noise (e.g., static, horns, barking, etc.), caller noise (cough, sneeze, etc.), questionable or incomprehensible sound, unrelated speech, hesitation (um, ah, er, like, you know, etc.), a cutoff word, etc.

After the user is satisfied with the current transcription of the current audio file, the system may allow the user to submit the current transcription for the current audio file. For example, the user interface may include a "submit" button.

FIGS. 3A-3D show different views of an illustrative embodiment of a user interface for annotating sentences by a user developing a natural-language system (e.g., a virtual assistant, a voice dialog system). In one embodiment, the user interface is designed to appeal to any user, not only a user trained in natural-language science.

Figure 3A:
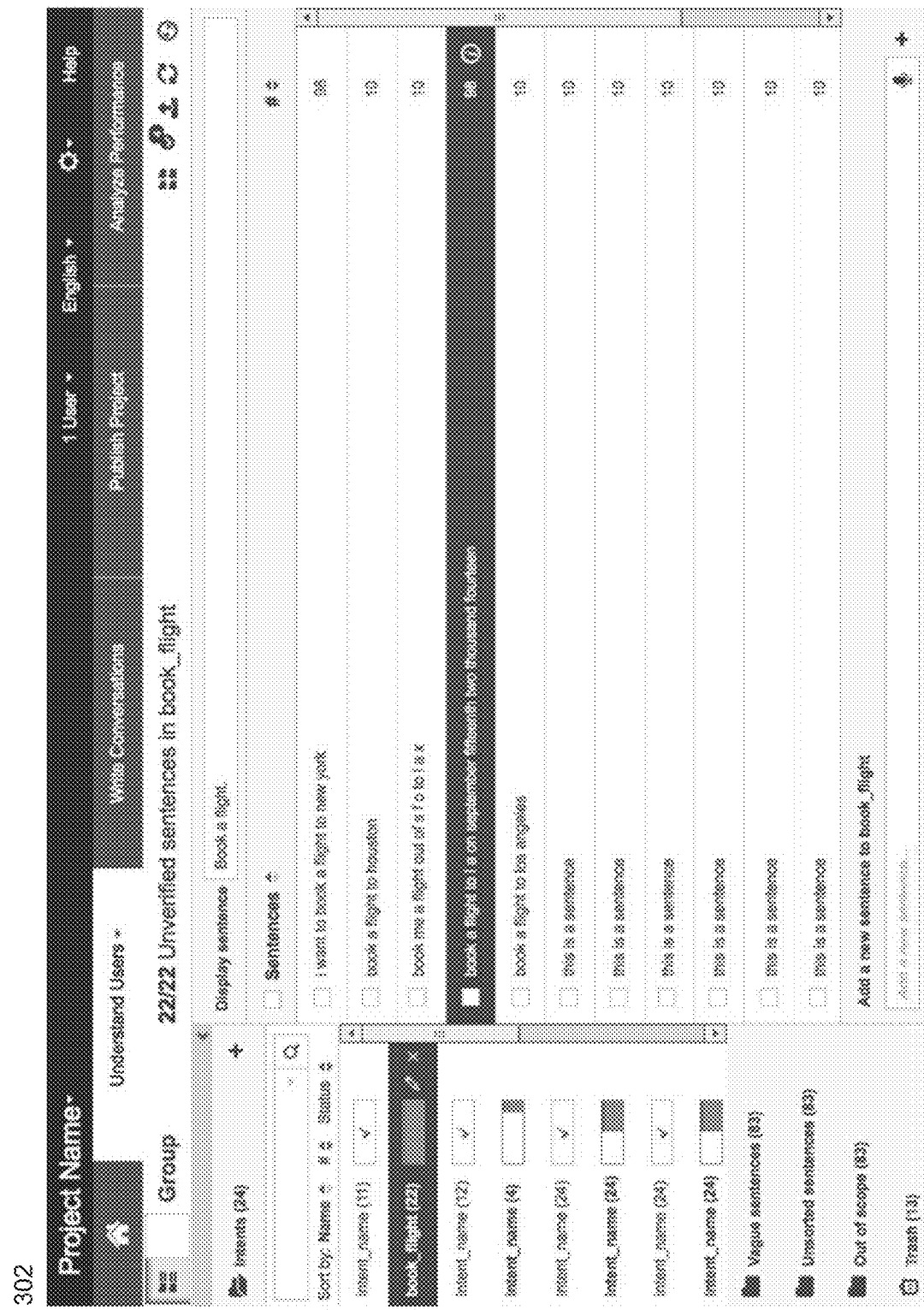
FIGS. 3A-3D depict illustrative screens of a user interface for associating sentences with intents and tagging words in sentences with concepts in a natural-language development system in accordance with one or more example embodiments.
Figure 3B:
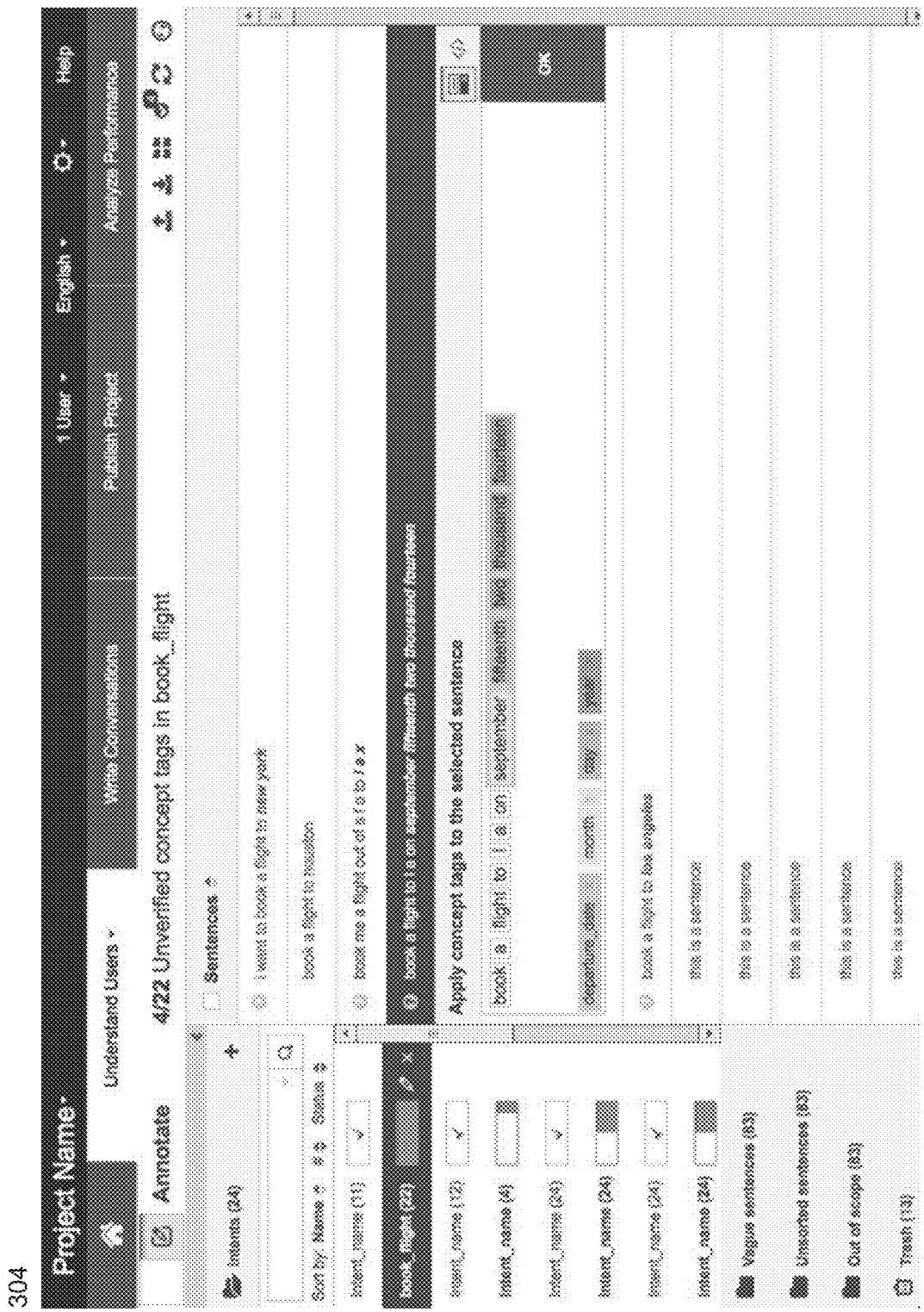

In FIG. 3A, screen 302 of the user interface may include a list of intents along the left side of the user interface. Each intent may correspond to a capability of the natural-language system being developed. For example, in the illustrated embodiment, the natural-language system relates to a flight booking system. Each intent, therefore, relates to a capability of the natural-language system for booking flights. For example, "book_flight" is an intent related to the capability of the system to book a flight.

The right side of screen 302 may display a list of sentences. A sentence may be a sentence that was input to the system via the automatic transcription process described in connection with FIG. 2. Alternatively, a sentence may be manually input to the system by a user (e.g., typed in using the "Add a new sentence" window at the bottom of the interface). Each sentence may correspond to a potential phrase, utterance, command, or sentence that a user may say to a natural-language system. Each sentence may be a different variation of a particular sentence that a user may say to a natural-language system. For example, one sentence may be "I want to book a flight to New York," while another sentence may be "I would like to book a flight to New York." Each sentence may have a similar or related meaning (e.g., the user wants to book a flight), but use different language in expressing that intent.

After receiving a new sentence, the system may automatically categorize (e.g., predict) the sentence as belonging to a particular intent. The system may detect words or phrases in the sentence, and match those words or phrases to similar words or phrases already categorized as being part of a particular intent. Categorizing a large number of sentences by intent may help the system better understand user commands, and how those user commands may relate to functionality of the system.

The system may graphically display intent predictions with particular sentences. For example, the system may include an icon, a particular color, font, or other visual representation to convey to the user that the intent that the sentence is categorized in was predicted by the system.

The system may receive from the user a verification of a sentence belonging in a particular intent. A user may verify that a particular sentence is associated with a particular intent, or may move a particular sentence to a different intent. For example, if a sentence "I want to book a flight" is automatically classified as belonging to the "book_flight"

intent, the user may verify that the sentence belongs to the "book_flight" intent. In another example, if a sentence "I want to book a night in L.A." is automatically classified as belonging to the "book_flight" intent, the user may reclassify the sentence as belonging to the "book hotel" intent. In one embodiment of a user interface, the user may click and drag a sentence into a particular intent in the list of intents to add that sentence to the particular intent. The user may also click a "verify" button, enter a key combination, or use some other input method to verify to the system the particular intent with which that sentence should be classified.

Thus, the system may dissociate a request string of a list of request strings from a selected intent in response to one or more inputs received from a user of the user interface, and associate the request string with a different intent than the selected intent in response to the one or more inputs received from the user.

The system may learn about how to classify sentences into intents based on verifications or corrections of sentences being associated with particular intents. The system may dynamically update intent predictions for unverified sentences as the system receives verifications of or corrections to other intent predictions.

A user may select a particular sentence in an intent, as shown in FIG. 3A. After selecting a particular sentence, the user interface may display concept tags in the selected sentence, as shown in screen 304 in FIG. 3B. The system may apply a concept tag to a single word in a sentence, or to multiple words (e.g., a phrase) in a sentence. The system may apply a single concept tag to a word or phrase, or may apply multiple concept tags to a word or phrase. The system may apply a concept tag to a single word or phrase, or may apply the same concept tag to multiple words or phrases. The system may consider the surrounding word or words in a sentence or phrase to determine the concept of a particular word or phrase.

When applying concept tags to a sentence, the system may interpret each word in the sentence, and may attempt to match each word in the sentence to a meaning. For example, the sentence "book a flight to L.A. on September fifteenth two thousand fourteen" may be matched automatically to several concepts. Specifically, "September fifteenth two thousand fourteen" may be matched to the concept of a flight departure date. Further, "September" may be matched to the concept of a month. "Fifteenth" may be matched to the concept of a day. "Two thousand fourteen" may be matched to the concept of a year.

Figure 3C:
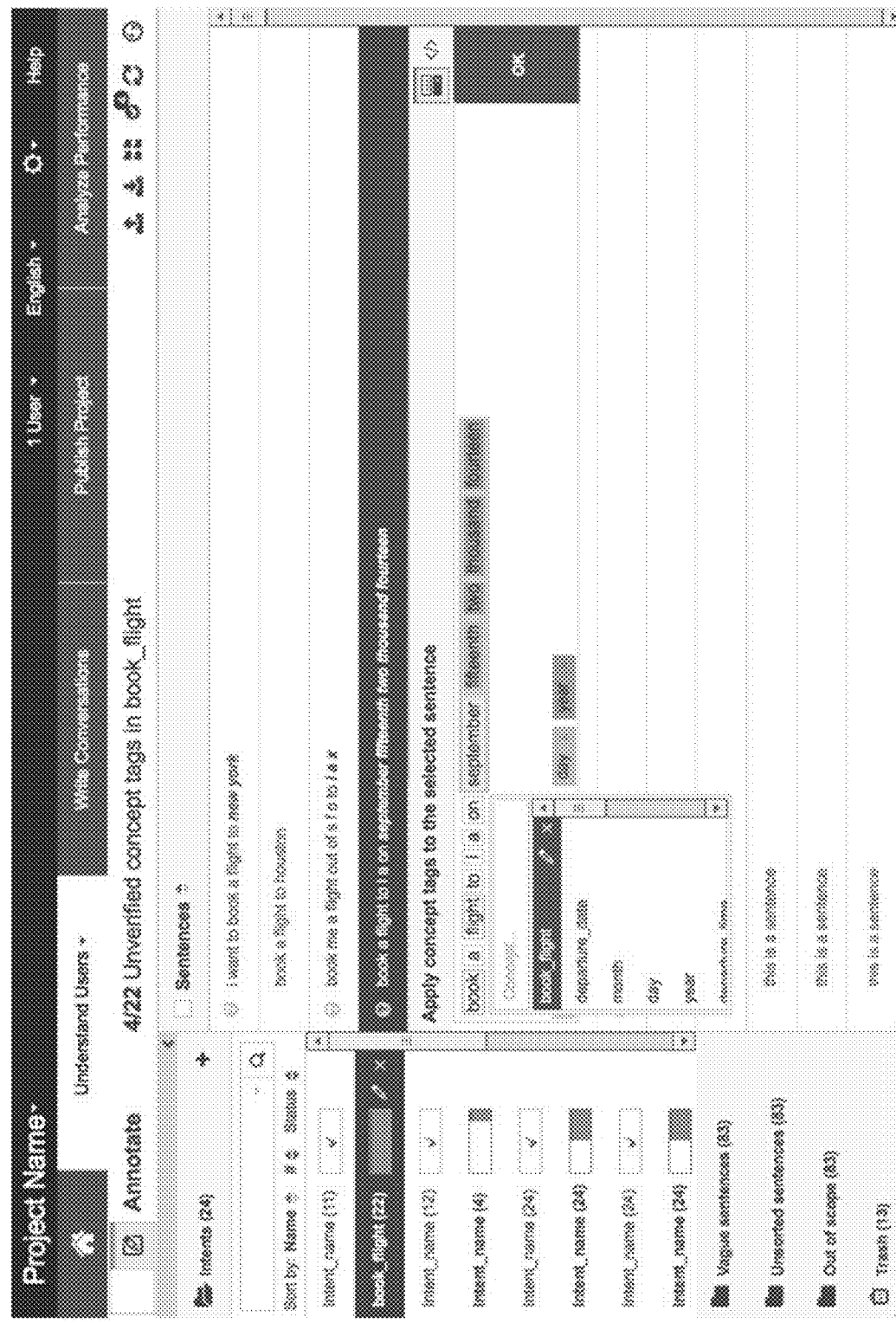

As shown in screen 306 of FIG. 3C, the user interface may allow a user to add a particular concept to a word or phrase. After selecting a particular word or phrase in the selected sentence, the user interface may display a pop-up box with a list of concepts related to the intent associated with the selected sentence. The user may select a concept from the list of concepts, or may add a new concept to the list of concepts. After selecting a concept from the list of concepts, the user interface may update the selected sentence to display a color associated with the newly-added concept. The user interface may display a concept tag associated with the newly-added concept.

The list of concepts may be related to the intent—if the user selects a different intent (e.g., from the list of intents on the left side of the user interface), the list of concepts associated with a particular sentence, or that are displayed when a user associates a word with a new concept, may be different.

The system may create a new canonical value associated with a concept. A canonical example may be a real world meaning of a term. For example, the system may associate the phrase "L.A." with the city of Los Angeles in California in the United States.

The system may automatically tag a whole group of sentences with a concept tag based on a concept tag being applied to a single word. For example, if the user tags a single instance of the term "Chi-town" with the city of Chicago in Illinois in the United States, the system may tag one or more other uses of the term "Chi-town" in other sentences to also be associated with the city of Chicago. The system may graphically display predicted concept tags to a user for the user to verify or correct. The system may learn from the user's verifications or corrections of predicted concept tags, and dynamically update other concept tags as the user verifies or corrects more concept tags.

Figure 3D:
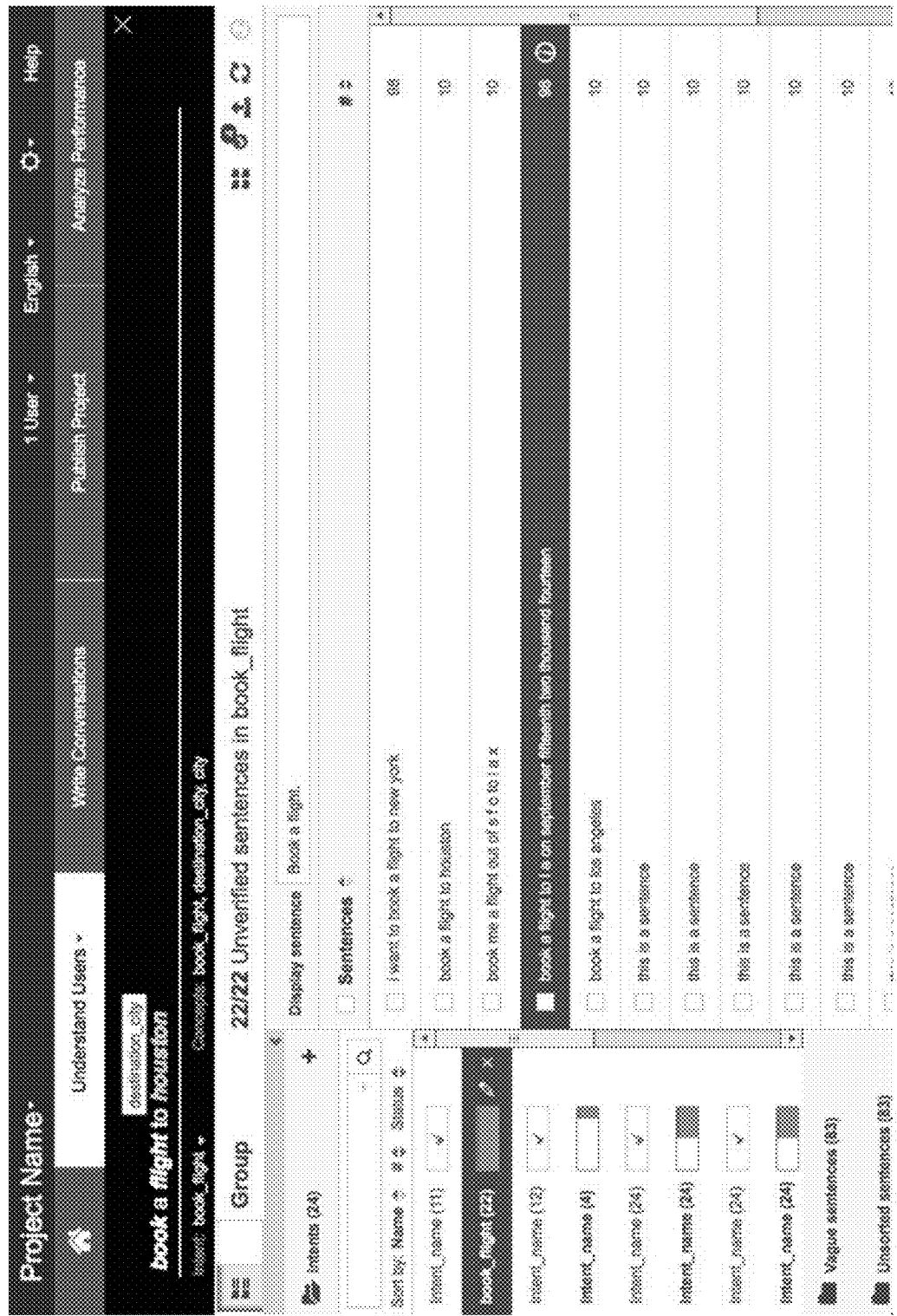

As shown in screen 308 of FIG. 3D, the user interface may allow a user to enter a test sentence. For example, the user may select a button that displays the portion of the user interface for entering the test sentence. In the illustrated example, a test sentence entry window may appear at the top of the screen. The user may enter a test sentence into the test sentence window. The system may interpret the test sentence based on information in the system (e.g., intents, sentences in intents, concepts, etc.). The system may display the intent and associated concepts that the system understands from the test sentence. For example, the test sentence "book a flight to Houston" may be interpreted to belong to the "book_flight" intent, and may be interpreted to include the concepts of "book_flight," "destination_city," and "city."

The user interface may highlight a particular word and display the concept associated with that particular word if the user selects or hovers with a cursor over that particular word in the test sentence. For example, in the embodiment illustrated in FIG. 3D, the user may have selected "houston," and the user interface may display "destination_city" as a concept corresponding to "houston."

FIGS. 4A-4D show an illustrative flow diagrams for a system that categorizes sentences into intents and applies concept tags to words within the sentences (e.g., a system that may include the user interface illustrated in FIGS. 3A-3D).

Figure 4A:
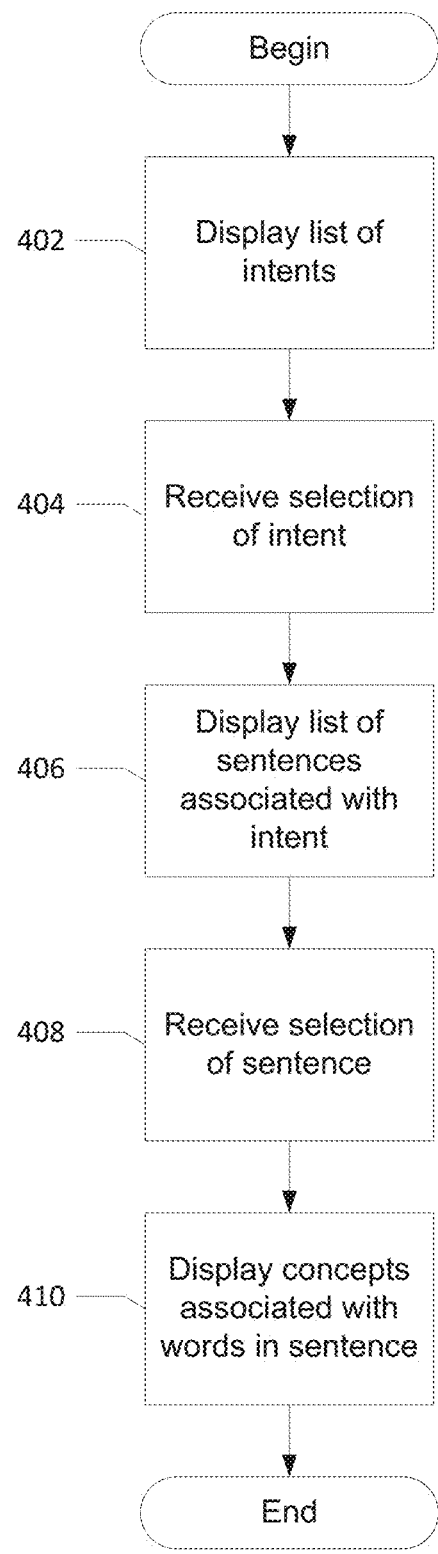
FIG. 4A depicts an illustrative flow diagram of a method for displaying relationships between sentences, intents, and concepts in a natural-language development system in accordance with one or more example embodiments.

FIG. 4A shows a flow diagram for an illustrative method of receiving and processing input from a user for training a natural-language system. The system may use the training to construct a grammar, which the system may then use to process user utterances (e.g., categorize utterances into intents, apply concept tags to words, etc.).

In step 402, the system may display a list of intents. For example, a first display area of a user interface may display a list of one or more intents. Each intent of the one or more intents may be associated with a process that can be performed by a language-processing system. In step 404, the system may receive a selection of an intent of the list of intents. For example, a user may select an intent from the list displayed by the user interface.

In step 406, the system may display a list of sentences associated with the intent. In step 408, the system may receive a selection of a sentence from the list of sentences associated with the intent. For example, a second display area of the user interface may display a list of request strings (e.g., user utterances). The list of request strings may be automatically updated, responsive to a selection of an intent from the list of one or more intents in the first display area, to include one or more request strings associated with the selected intent.

In step 410, the system may display concepts associated with words in the sentence. For example, a third display area of the user interface may display one or more concept tags respectively corresponding to one or more concepts respectively associated with one or more associated words in a request string of the list of request strings in the second display area. The third display area may receive input associating one or more unassociated words in the request string with one or more concepts. The one or more concepts may be associated with the selected intent. The request string of the list of request strings in the second display area may be associated with the selected intent.

In some embodiments, a display area might not be displayed all the time. A display area may be shown in response to receiving an input from the user, or may similarly be hidden in response to receiving an input from the user. For example, the third display area may be displayed in response to a selection of the request string of the list of request strings in the second display area, and the third display area may be hidden in response to a deselection of the request string of the list of request strings in the second display area.

In some embodiments, the system may include a fourth display area that may receive a request string, and display one or more concept tags respectively associated with one or more concepts respectively associated with one or more words in the request string. The one or more concepts may be associated with the intent associated with the request string. In some embodiments, the fourth display area may automatically update the one or more concept tags responsive to receiving input indicating a user-added association between a different intent and the request string. For example, a user may indicate that a sentence should be associated with a different intent. After the sentence is associated with the different intent, the system may automatically recalculate the concept tags associated with each word or phrase in the sentence to include concept tags associated with concepts associated with the different intent.

Figure 4B:
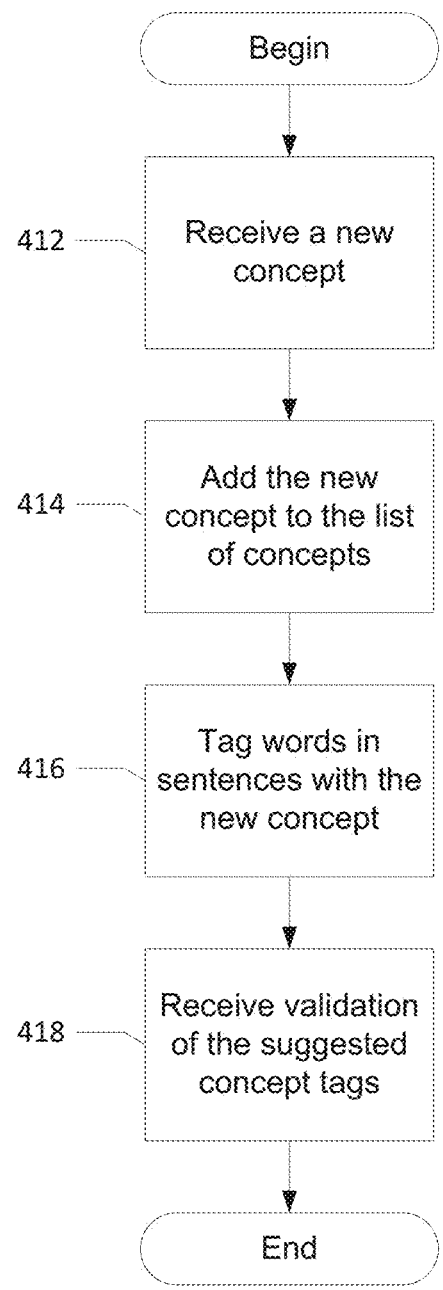
FIG. 4B depicts an illustrative flow diagram of a method for associating words in a sentence with concepts in a natural-language development system in accordance with one or more example embodiments.

FIG. 4B shows an illustrative embodiment of a method for adding new concepts to a natural-language development system and tagging words in a sentence with concept tags corresponding to the new concepts.

In step 412, a system may receive a new concept. An intent may have one or more concepts associated with the intent. A concept may be associated with a single intent, or may be associated with multiple intents.

In step 414, the system may add the new concept to the list of concepts. A user may provide input to the system indicating a new concept to associate with a particular intent. The system may display the new concept in the list of concepts. For example, in some embodiments, a display area (e.g., the third display area discussed in connection with FIG. 4A) may automatically display a new concept in a list of concepts associated with the selected intent responsive to receiving input adding the new concept to the one or more concepts associated with the selected intent.

In step 416, the system may tag words in sentences with the new concept. For example, the intent may have multiple sentences associated with the intent. Each sentence may include one or more words. The system may consider applying concept tags to all the words, untagged words, tagged words, or some combination of untagged and tagged words. The system may tag a word with a concept if there are other similar words tagged with that concept, if the word is shorthand, slang, or an acronym for the concept, if the word is associated with other words associated with the concept, or some other method known to one of skill in the art.

The system may suggest tags for additional concepts (e.g., concepts other than the new concept). For example, the system may suggest tags for all concepts associated with the intent the sentence is in.

In step 418, the system may receive validation of the suggested concept tags. The system may display suggested concept tags differently than validated concept tags. For example, a user may manually add concept tags to words. When a user manually adds a concept tag to a word, the concept tag may automatically be considered validated. When the system adds a concept tag to a word, the system may indicate that the concept tag is suggested. After the user confirms that the concept tag applies to the word, the concept tag may display as validated.

Figure 4C:
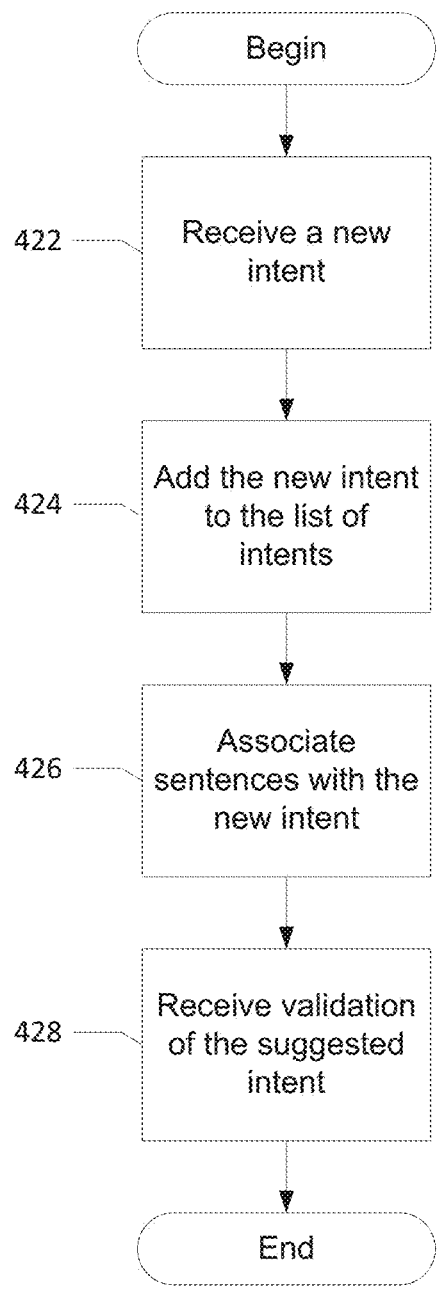
FIG. 4C depicts an illustrative flow diagram of a method for associating a sentence with an intent in a natural-language development system in accordance with one or more example embodiments.

FIG. 4C shows an illustrative embodiment of a method for adding a new intent to a natural-language development system and associating sentences with the new intent.

In step 422, the system may receive a new intent. For example, a user may add a new intent. In step 424, the system may add the new intent to the list of intents.

In step 426, the system may associate sentences with the new intent. For example, the system may have a list of sentences not already associated with an intent, and may add one or more of those sentences to the new intent. The system may have a list of sentences with suggested intents that have not been verified by the user. The system may reprocess sentences with suggested unverified intents to determine if any of the new intent would be more appropriate than the previously-suggested intent.

In step 428, the system may receive validation of the suggested intent. For example, a user may view a list of sentences with suggested intents. A sentence with a suggested intent may include an indication that the intent is suggested. The user may confirm that a sentence belongs in a particular intent, indicate that the sentence does not belong in the particular intent, or associate the sentence with a different intent (e.g., a correct intent).

Figure 4D:
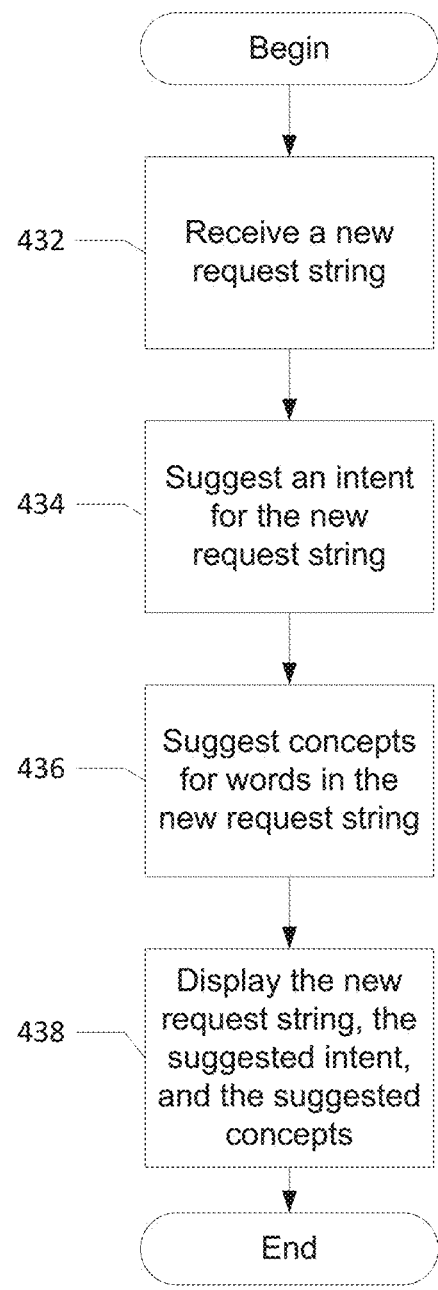
FIG. 4D depicts an illustrative flow diagram of a method for associating a newly received sentence with an intent and concepts in a natural-language development system in accordance with one or more example embodiments.

FIG. 4D shows an illustrative embodiment of a method for suggesting an intent and concepts for a new sentence received by a natural-language system. The system may use a grammar for processing new sentences received by the system. The grammar may be generated using the request strings, the one or more intents, and the one or more concepts. The grammar may include a set of word patterns that the device uses to process a new request string.

In step 432, the system may receive a new request string (e.g., a request string not currently in the list of request strings).

In step 434, the system may suggest an intent of the list of one or more intents to associate with the new request string. For example, a system may receive a new user utterance "I would like to reserve a seat on a flight," which the system may suggest be associated with the "book_flight" intent. The system may suggest the intent of the list of one or more intents to associate with the new request string based on the grammar.

In step 436, the system may suggest one or more concept tags respectively corresponding to one or more concepts to respectively associate with one or more words in the new request string. The one or more concepts may be associated with the suggested intent. The system may suggest the one or more concept tags respectively corresponding to the one or more concepts to respectively associate with the one or more words in the new request string based on the grammar.

In step 438, the system may display the new request string, the suggested intent, and the suggested one or more concept tags in the user interface.

In some embodiments, the system may receive validation of the suggested intent, and associate the new request string with the suggested intent.

In some embodiments, the system may receive validation of the suggested one or more concept tags, and associate the suggested one or more concept tags respectively corresponding to the one or more concepts with the one or more words in the new request string.

FIGS. 5A-5H show different views of an illustrative embodiment of a user interface for developing a chat transcript representative of a dialog between a user and a natural-language system (e.g., a virtual assistant, a voice dialog system). The system may allow a user to develop a natural-language dialog in the form of a chat transcript. A chat transcript may provide a visual representation of a tree dialog between a user and a system. Specifically, a chat transcript may include one or more user inputs, and one or more system responses. For example, the user may provide a command to the system, the system may respond to the command, the user may respond to the system response, the system may respond to the user, and so on. A chat transcript may include any number of back-and-forth interactions between the user and the system. In some interactions, the system may respond differently depending on the user response.

Figure 5A:
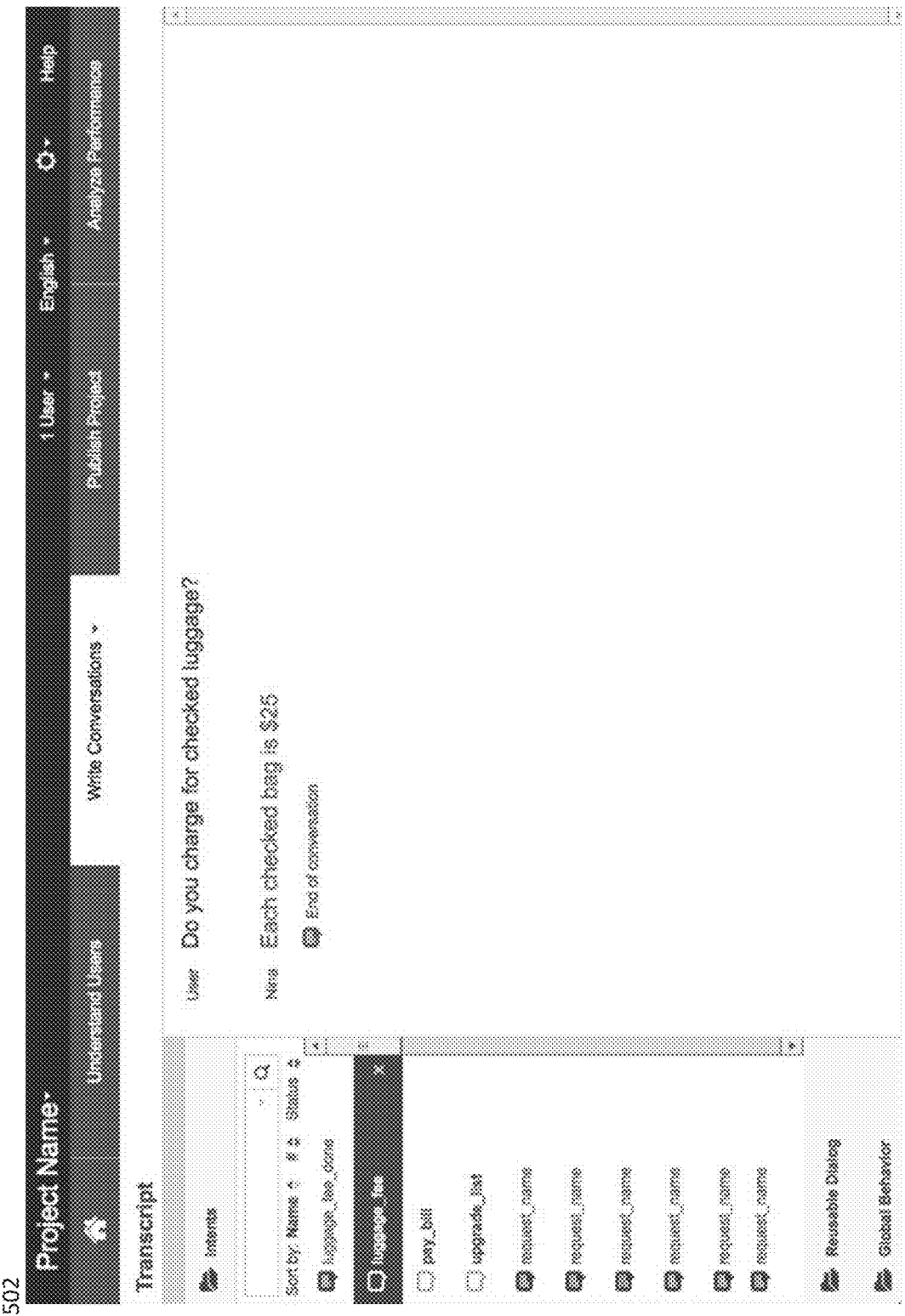
FIGS. 5A-5H depict illustrative screens of a user interface that displays as a chat transcript a tree with branches and nodes corresponding to user responses and system responses in a natural-language system in accordance with one or more example embodiments.

FIG. 5A shows an example screen 502 of a user interface that displays a chat dialog between a user and a system. A dialog may be associated with a particular intent. A particular intent may have one or more dialogs associated with the intent. The intents displayed on the chat dialog development user interface may be the same as the intents displayed on the user interface described in connection with FIG. 3. Thus, if a user adds a new intent while using the chat dialog development screen, the new intent may show up in the list of intents on the sentence-verification user-interface screen.

In the illustrated example, the system may be associated with an airline-support system, and the illustrated chat transcript may be associated with a "luggagefee" intent (e.g., checking how much the airline charges for a luggage fee). The user may prompt the system with an initial question, "Do you charge for checked luggage?" The system may respond with, "Each checked bag is $25."

Figure 5B:
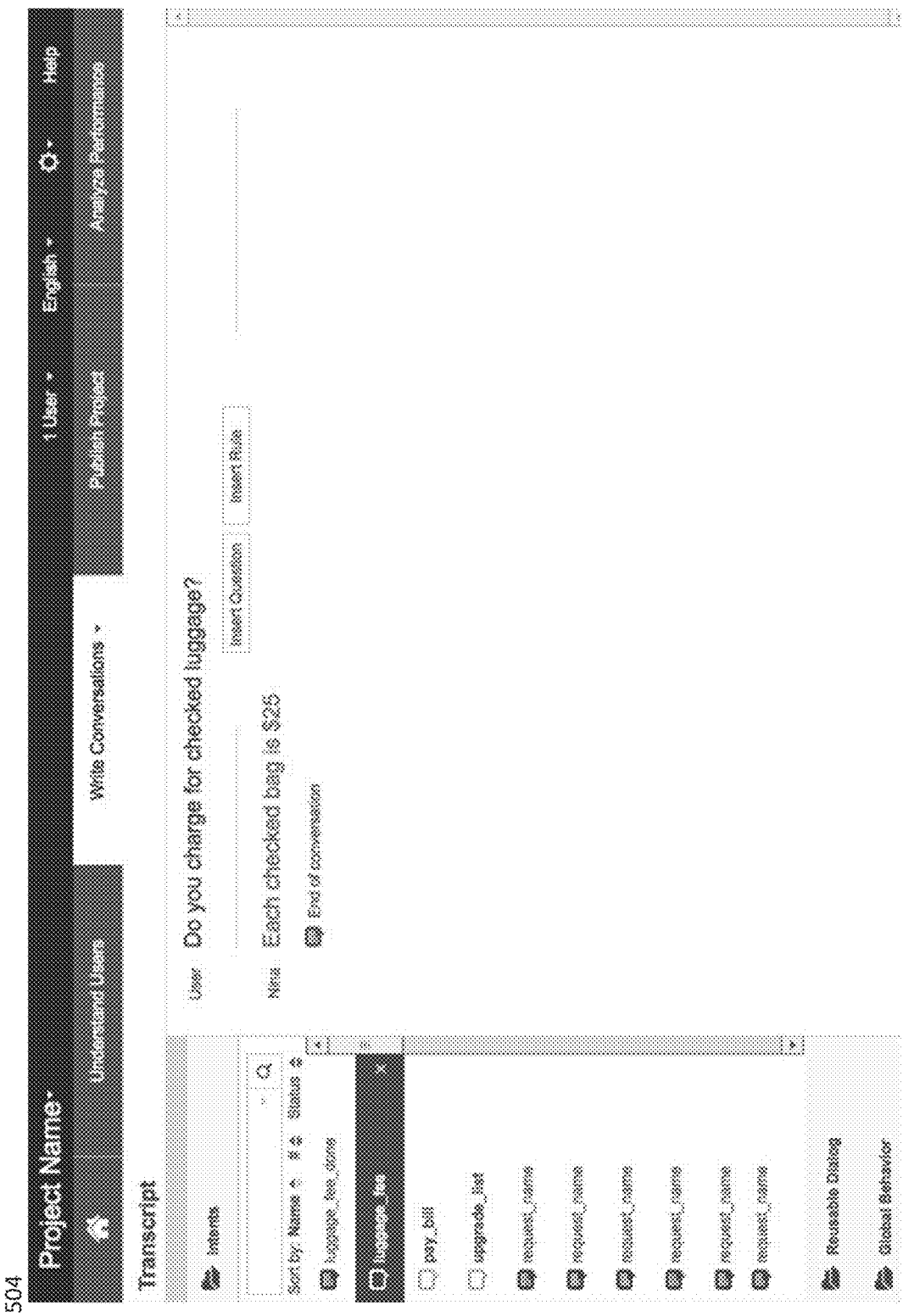

A user may wish to add additional branches to the chat dialog. FIG. 5B shows an illustrative example of an interface for adding a branch to the chat dialog. The user may provide an input to the system (e.g., press a button, enter a command) that causes the user interface to display one or more options for modifying the chat dialog. For example, screen 504 of FIG. 5B shows the options "Insert Question" and "Insert Rule."

The system may allow a user to add a question that the system may ask the user in response to the user's initial question. For example, in response to the user's initial question, "Do you charge for checked luggage?" the system may ask, "What is your member level in our frequent flier program?"

The system may allow a user to add a rule that the system may use for determining the system's response to the user's initial question. A rule may insert branching logic that might not be dependent on the user's response. Branching logic may be dependent on something other than the user's response. For example, if the user has identified herself to the system, the system may look up the user's information (e.g., frequent flyer number, account information, preferences, etc.). In some embodiments, the system may use the looked-up information to assist the user, rather than ask the user for the information.

Figure 5C:
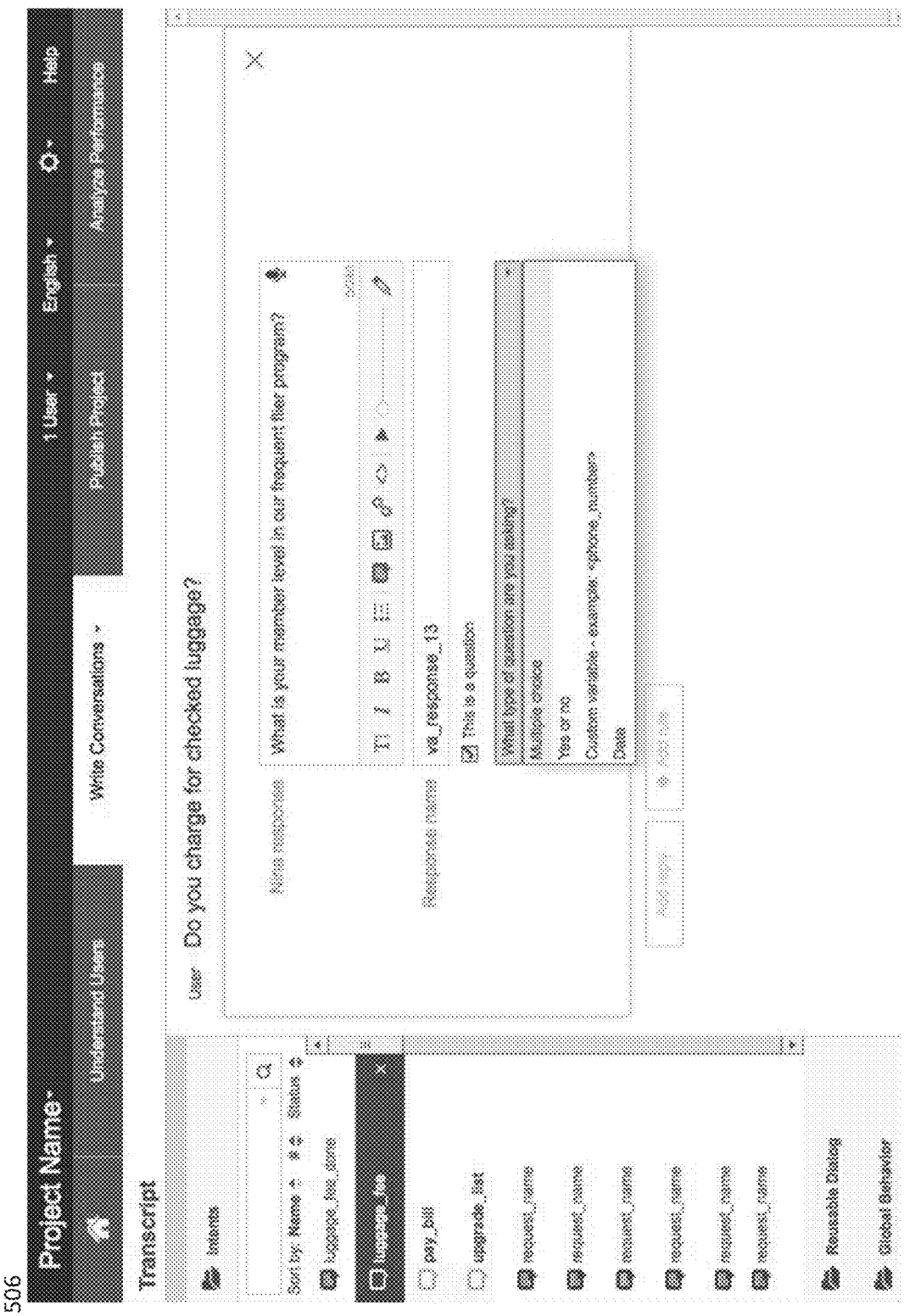

FIG. 5C shows an illustrative screen (e.g., screen 506) for inserting a question that the system may ask the user in response to the user's initial question.

Screen 506 of the user interface may include an area for the user to enter the system's response to the user's initial question. For example, the system response to the user's initial question may include, "What is your member level in our frequent flier program?"

The system response may be classified according to the type of response. For example, the response may be classified as a question or a statement (e.g., by marking the box labeled "This is a question"). The user may indicate additional information about the response. For example, if the response is a question, the user may indicate the type of question (e.g., multiple choice, yes or no, custom variable, date).

Figure 5D:
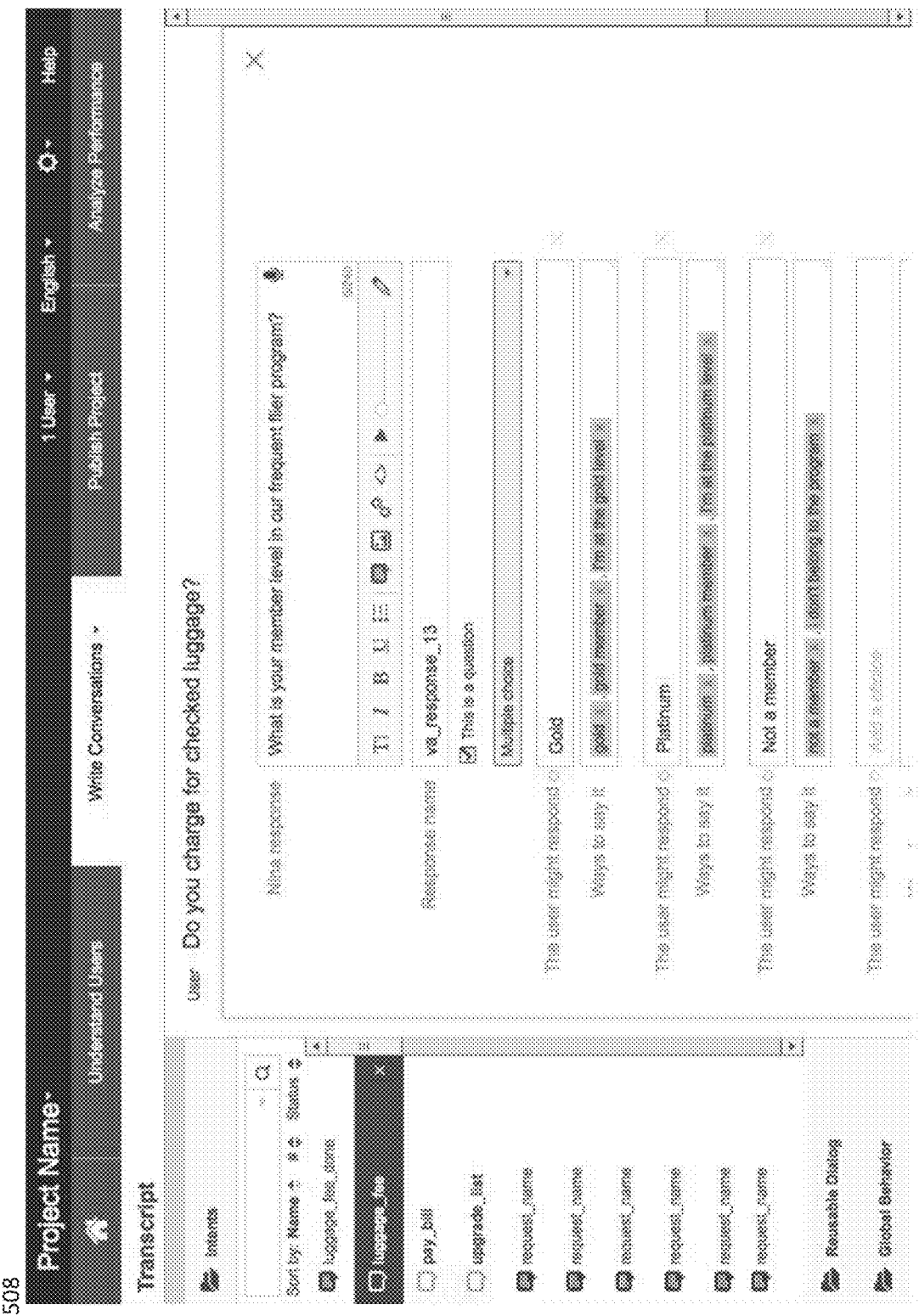

As depicted in screen 508 of FIG. 5D, the user interface may allow the user to input potential responses from the user to the system response. For example, the system response may ask, "What is your member level in our frequent flier program?" A user may respond, "Gold," "Platinum," or "Not a member."

Each potential response from the system or the user may create a new branch of a tree. Each branch of a tree may include a connection between two nodes of the tree. For example, the first node of the tree may be, "Do you charge for checked luggage?" The next node may be the system response, "What is your member level in our frequent flier program?" A user may give one of three responses—gold, platinum, or not a member. Each of the three responses may form a different corresponding branch of the tree.

For each potential response that a user may give to the system response, the user may input multiple ways to say that response. For example, the user response of "Gold" may be said, "I'm gold," "Gold," "Gold member," "I'm at the gold level," etc. The user may add a number of different phrases or utterances that a user may give that have a particular meaning.

Figure 5E:
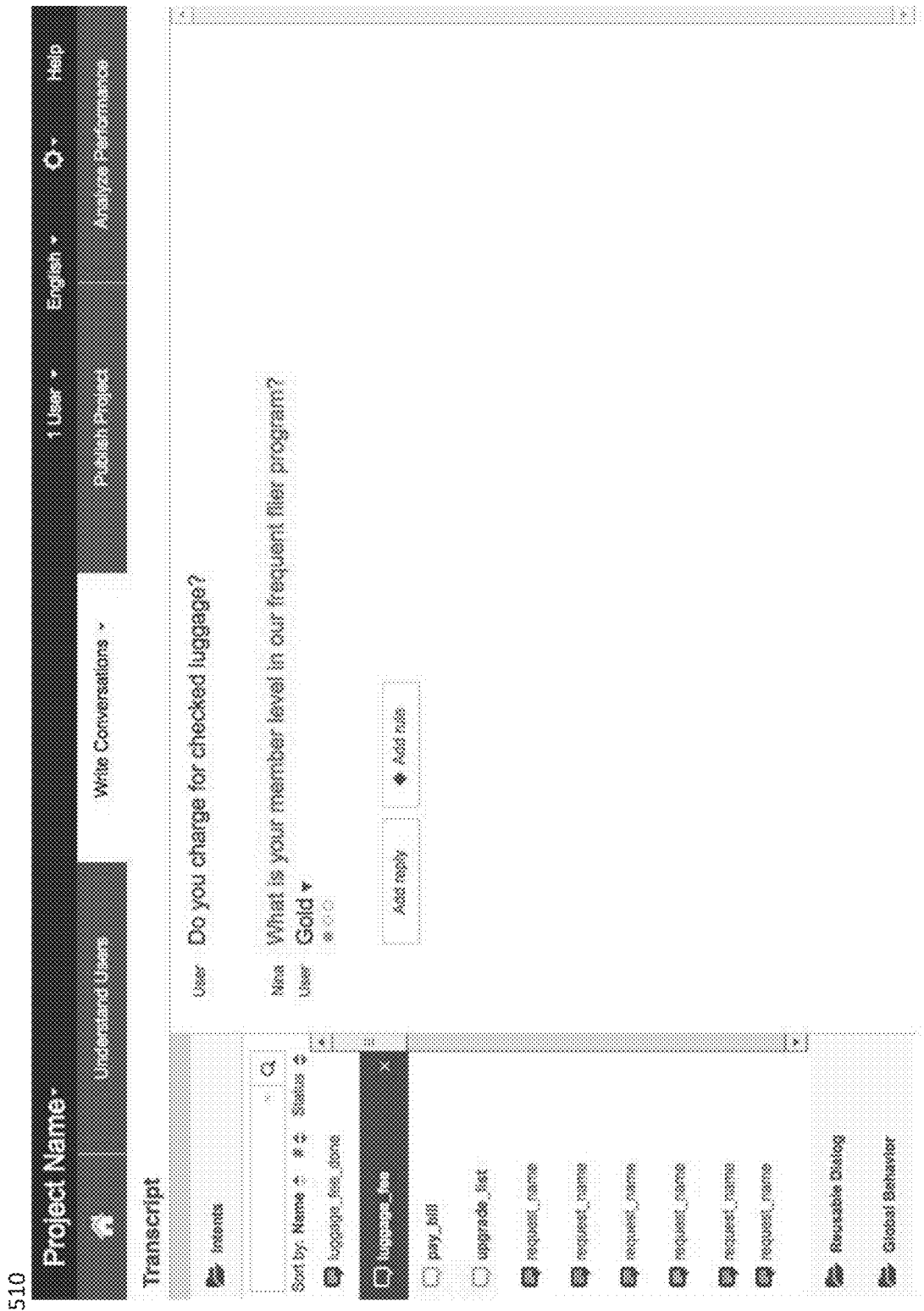

As depicted in screen 510 of FIG. 5E, the user interface may show the dialog back and forth between a user and a system as a chat transcript. Where the user may give multiple responses to a system utterance (e.g., a question), the chat transcript may show only one potential user response. The user interface may indicate that there are multiple potential user responses (e.g., a circle for each potential user response, a number, a shape, an icon). The user interface may allow the user to select which user response to show in the chat transcript, or to toggle between different user responses in the chat transcript, as discussed in further detail below.

Figure 5F:
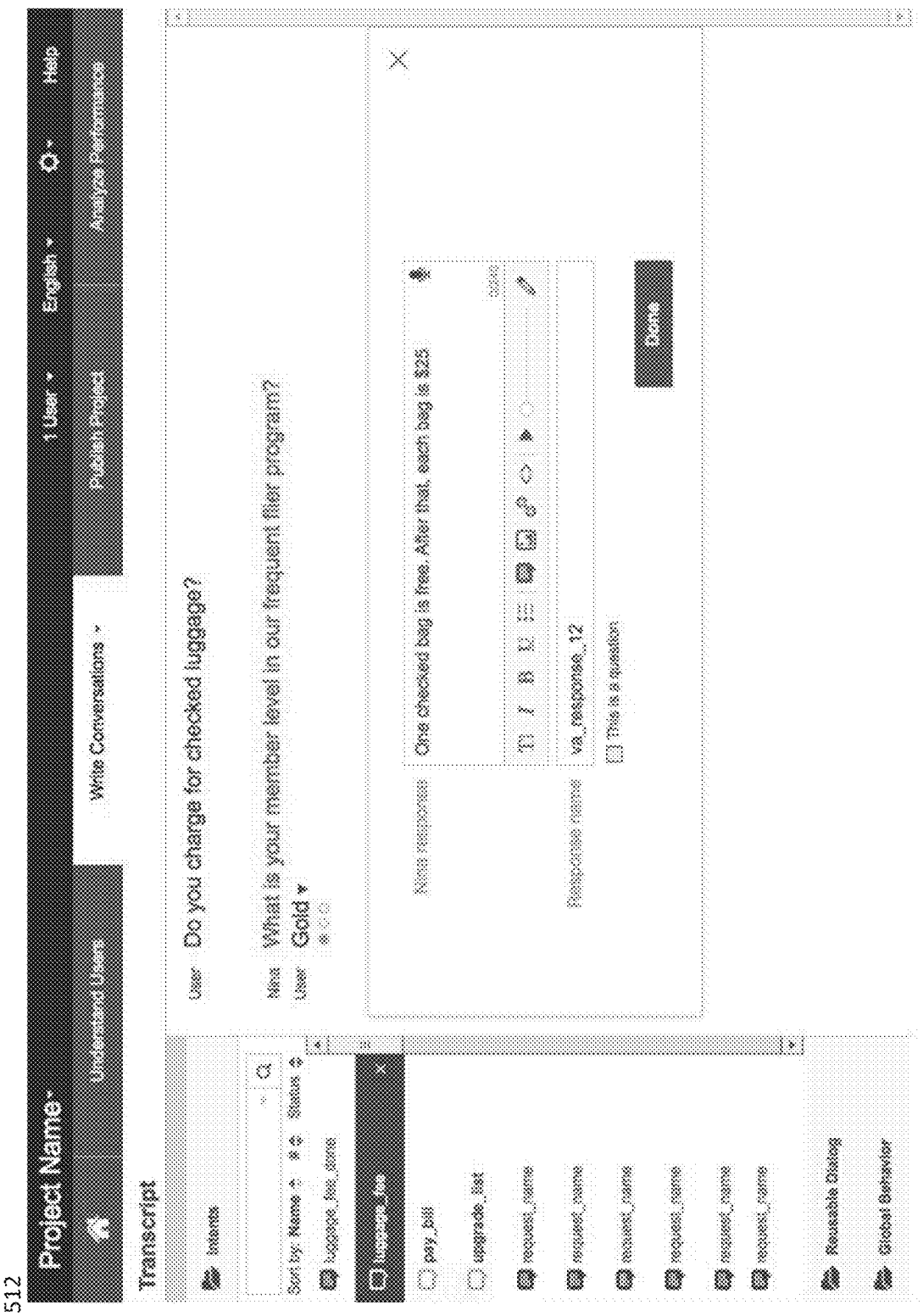

The user may add additional interactions between the system and the user. For example, the user may select "Add reply," which may add a reply that the system may give to the user response. FIG. 5F depicts screen 512 of an illustrative user interface that may allow a user to add a response from the system to the user. Screen 512 may be similar to screen 506 of the user interface described in connection with FIG. 5C. The user interface may allow the user to enter a system response, as well as information or details about the response.

A user may add different responses by the system to the different user responses. For example, after the user responds, "Gold," the system may say "One checked bag is free. After that, each bag is $25." If the user responds "Platinum" (instead of "Gold"), the system may say, "Two checked bags are free. After that, each bag is $25."

Figure 5G:
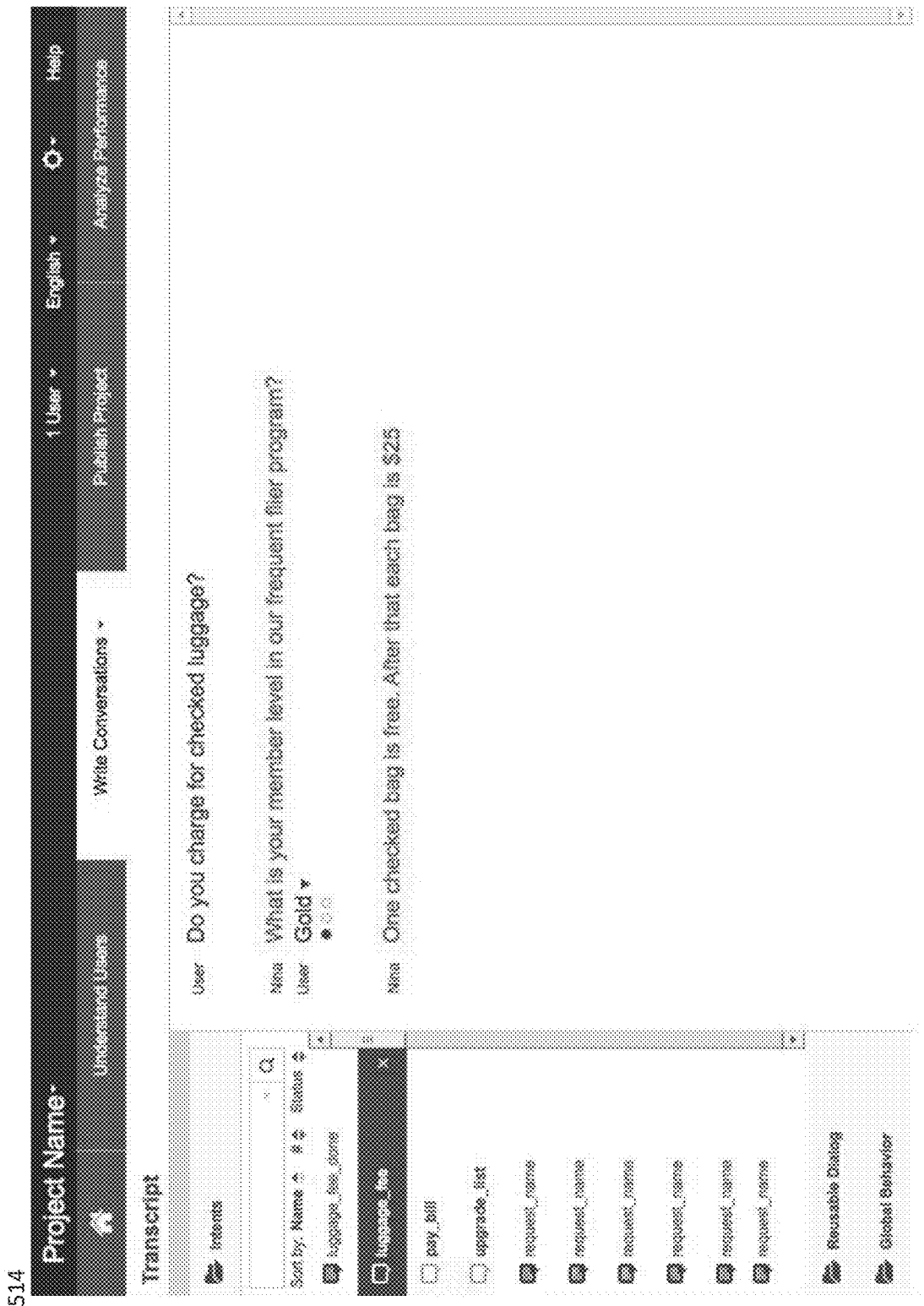
Figure 5H:
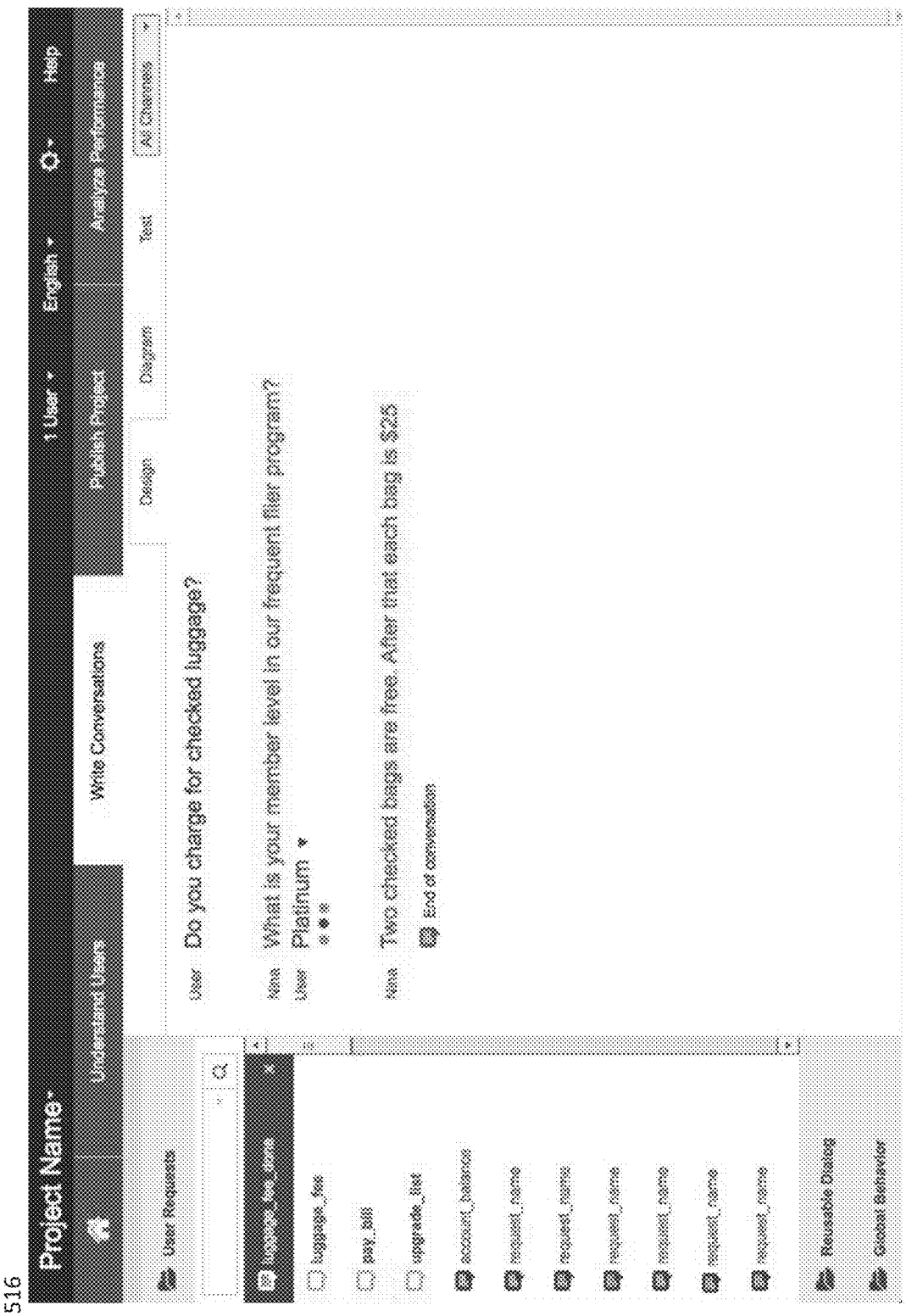

As depicted in screen 514 of FIG. 5G, the chat transcript may display one thread of conversation between the system and the user at a time, regardless of how many different potential branches are exist based on different user or system responses. For example, a user may provide the system with multiple responses, each of which may trigger a number of different potential responses by the system. Regardless of the number of possible combinations of user and system responses, the chat transcript may display one conversation thread.

Screen 514 of the user interface may allow a user to select which response to show at each node of discussion when there are multiple potential responses by the user or the system. If there are additional interactions between the system and the user after the point at which there could be multiple different user responses, then the chat transcript may update to show the different interactions between the system and the user. For example, in the chat transcript displayed in FIG. 5G, the user may respond that that the user's member level in the frequent flier program is Gold. As depicted in screen 516 of FIG. 5H, for example, if the user response is changed to Platinum, then the system and user responses after the changed user response in the chat dialog may update in response to the changed selection. Specifically, the system response may be updated to say, "Two checked bags are free. After that, each bag is $25."

Figure 5I:
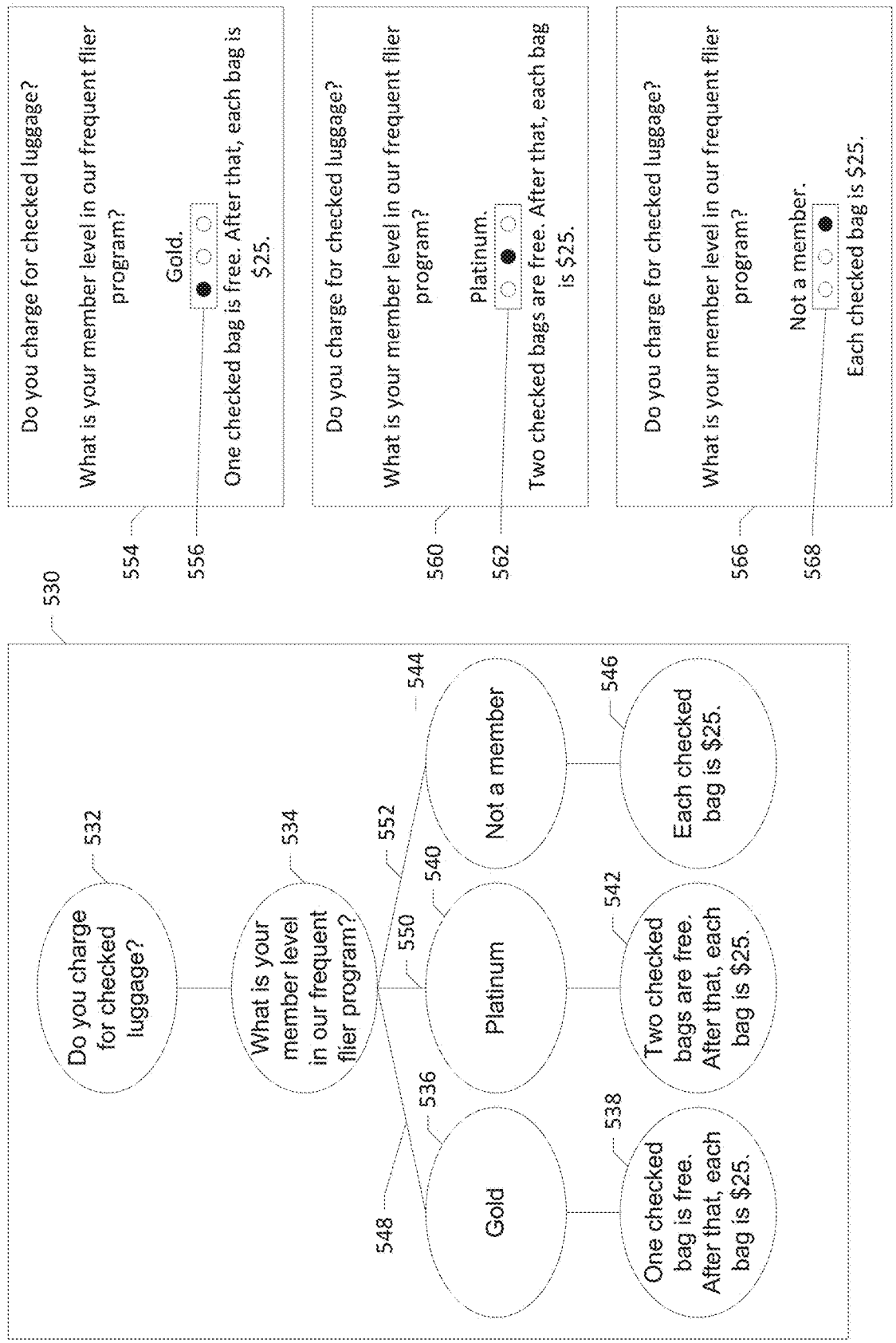
FIG. 5I depicts an illustrative tree corresponding illustrative chat transcripts based on different branches of the tree in accordance with one or more example embodiments.

FIG. 5I shows a tree and three illustrative chat transcript excerpts that correspond to different potential branches through the tree.

A tree (e.g., tree 530) may include one or more nodes (e.g., nodes 532, 534, 536, 538, 540, 542, 544, 546). A node (e.g., nodes 536, 540, 544) may be associated with a potential user response that a user may give to a natural-language system. Alternatively, a node (e.g., nodes 534, 538, 542, 546) may be associated with a potential system response that the natural-language system may give a user. A node may connect to one or more next nodes. For example, a question or statement may have only one answer, or may have multiple potential answers. The tree may include one or more branches. A branch may correspond to a point in the tree at which there are multiple nodes connected to a single node. For example, node 534 may connect to nodes 536, 540, and 544, corresponding to branches 548, 550, and 552.

A chat transcript may display a single path of discussion through the tree. For example, chat transcripts 554, 560, and 566 may correspond to different potential paths in tree 530. For example, chat transcript 554 may correspond to a path through tree 530 that includes branch 548. Chat transcript 560 may correspond to a path through tree 530 that includes branch 550. Chat transcript 566 may correspond to a path through tree 530 that includes branch 552.

As described earlier, the user interface may include a chat transcript that denotes a path through the tree. Chat transcripts 554, 560, and 566 depict different illustrative examples of chat transcripts that may be generated or displayed based on tree 530.

Each chat transcript may display an indication of the points (e.g., indicators 556, 562, 568) in the tree or transcript where different potential answers may be given. In the illustrated example, there are three next nodes 536, 540, 544 connected to node 534. Chat transcripts 554, 560, 566 therefore include three indicators 556, 562, 568 of different potential responses to the question "What is your member level in our frequent flier program?" An indicator for a displayed response may appear differently than an indicator for a non-displayed response (e.g., a dark circle instead of a light circle).

Each chat transcript includes different responses after the point in the transcript at which different potential answers may be given. The different responses reflect the different information that the system may give based on the different nodes in the tree after the branches 548, 550, 552.

Different branches of a tree may further split into additional branches. Different branches of a tree may reconnect to fewer branches.

In some embodiments, the user interface may display the tree as a tree similar to tree 530, in addition to or instead of displaying the tree as a navigable set of chat transcripts as described above.

Figure 6:
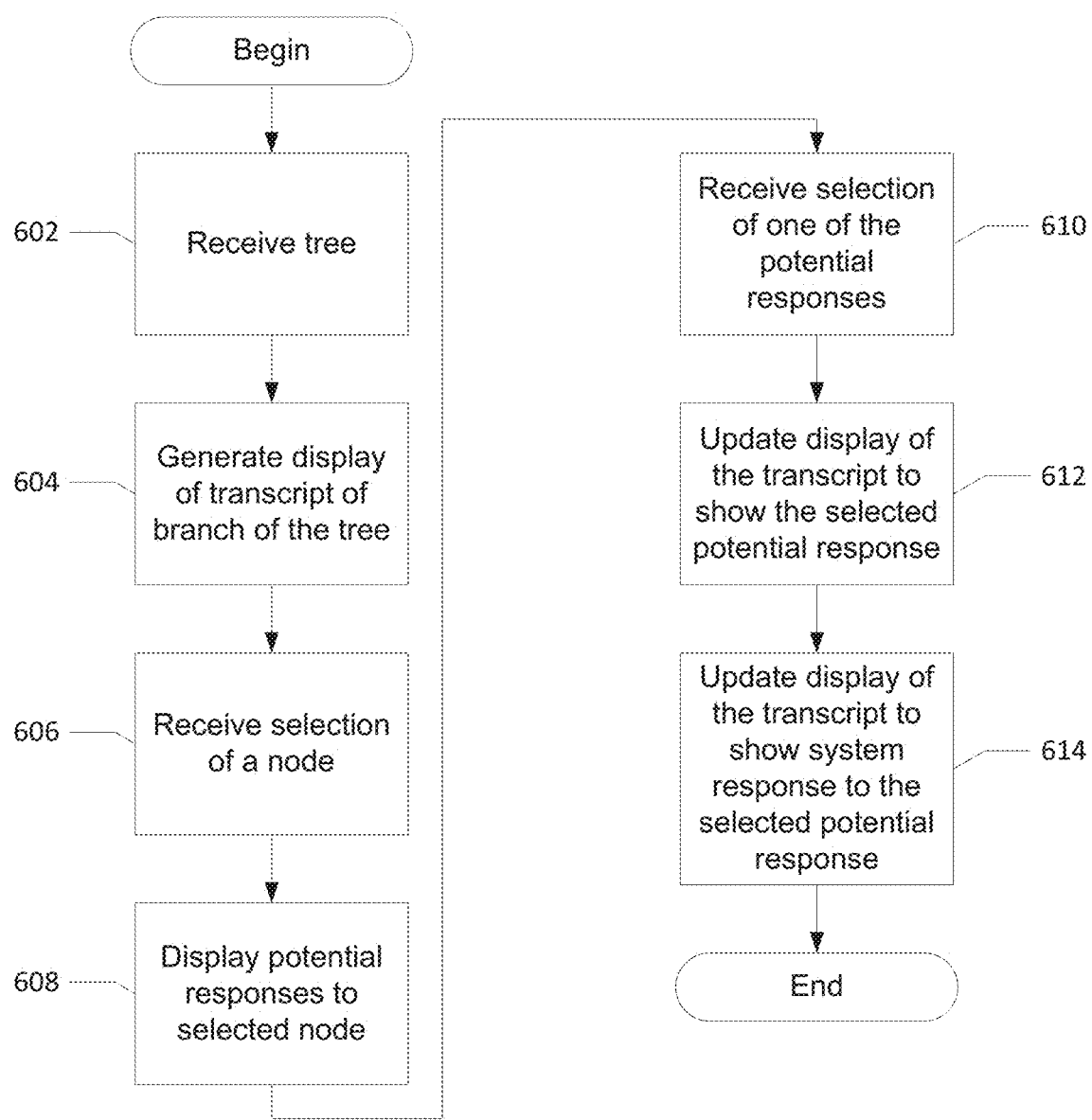
FIG. 6 depicts an illustrative flow diagram of a method for displaying as a chat transcript a tree with branches and nodes corresponding to user responses and system responses in a natural-language system in accordance with one or more example embodiments.

FIG. 6 shows an illustrative flow diagram for a system for developing a chat transcript between a user and a natural-language system.

In step 602, a system may receive a tree. The tree may include a plurality discussions between a virtual assistant and a user. Each discussion may be represented by one path through the tree. Each path may include one or more nodes. Each node of the one or more nodes may be associated with one of a plurality of potential user responses the user may give the virtual assistant, or one of a plurality of potential system responses that the virtual assistant may give the user. Each of the discussion paths may be associated with a function of the virtual assistant. Each of the discussion paths may be associated with a potential user response of the plurality of potential user responses.

The system may generate the tree itself, or may receive the tree from another source. A tree may be generated by a tree generator (e.g., part of the system, part of another system). A tree generator may, in one example, generate the tree by receiving a starting string, creating a top node of the tree using the starting string, receiving a response string responsive to the starting string, creating a next node using the response string—where a connection between the top node and the next node may include a branch of the tree. In some embodiments, the tree generator may receive a different-response string responsive to the starting string, and create a different node using the different-response string—where a connection between the top node and the different node may include a different branch of the tree. A tree or tree generator may allow for iteration. A user may add into the middle or extend the tree (e.g., in breadth, by adding a branch; in depth, by adding a level). Any node of an existing tree may play the role of the top node when the tree generator is adding to the existing tree. Alternation between a user and system might not necessarily be strict (e.g., there may be two system nodes in a row, two user nodes in a row).

In step 604, the system may generate a display of a transcript including a single discussion path through the tree. In one embodiment, the single discussion path may be determined by traversing the tree by taking a first branch at each node. In one embodiment, the single discussion path may be determined by traversing the tree by taking a most heavily traveled branch at each node. In one embodiment, the single discussion path may be determined by traversing the tree by taking an arbitrary selection of a branch at each node.

The transcript may include a series of interactions between the virtual assistant and the user. The alternation between system and user might not be strict (e.g., user, then system, then user, then system). For example, the system may give multiple interactions (e.g., system responses, system utterances) to a user in a row. Similarly, the user may give multiple interactions (e.g., user responses, user utterances) to the system in a row.

Each interaction of the series of interactions may be associated with a respective node of the one or more nodes. Each node of the one or more nodes may be associated with contextual information retrieved from another source. Each node of the one or more nodes may be associated with contextual information received during a configuration process. Each node of the one or more nodes may be associated with contextual information previously determined and stored.

In step 606, the system may receive a selection of a node of the one or more nodes.

In step 608, the system may display potential responses to the selected node. For example, the system may generate a display of the plurality of potential user responses respectively associated with a plurality of next nodes after the selected node. In another example, the system may generate a display of a plurality of potential system responses respectively associated with a plurality of next nodes after the selected node.

In step 610, the system may receive a selection of one or the potential responses to the selected node.

For example, the system may receive a selection of a user response of the displayed plurality of potential user responses respectively associated with a plurality of next nodes after the selected node. The system may generate a display of the plurality of potential user responses respectively associated with a plurality of next nodes after the selected node. The system may receive a selection of a user response of the displayed plurality of potential user responses.

In another example, the system may receive a selection of a system response of the displayed plurality of potential system responses respectively associated with a plurality of next nodes after the selected node. The system may generate a display of the plurality of potential system responses respectively associated with a plurality of next nodes after the selected node. The system may receive a selection of a system response of the displayed plurality of potential system responses.

In step 612, the system may update the display of the transcript to show the selected response. For example, the system may update the display of the transcript to show the selected user response. In another example, the system may update the display of the transcript to show the selected system response.

In step 614, the system may update the display of the transcript to show the system response to the selected potential response. For example, the system may update the display of the transcript to show the one or more system responses of the plurality of potential system responses. The one or more system responses may be associated with a next node of the plurality of next nodes after the selected node.

In another embodiment, the system may update the display of the transcript to show a user response to the selected potential response. For example, the system may update the display of the transcript to show the one or more user responses of the plurality of potential user responses. The one or more user responses may be associated with a next node of the plurality of next nodes after the selected node.

FIGS. 7A-7D show an illustrative embodiment of a natural-language development system that displays one or more variable values known to the system. By showing the variable values, the development system may allow a user to focus system testing on certain conditions. Showing variable values may allow a user to easily see what information the natural-language system has and does not have at a given point in the testing process.

Figure 7A:
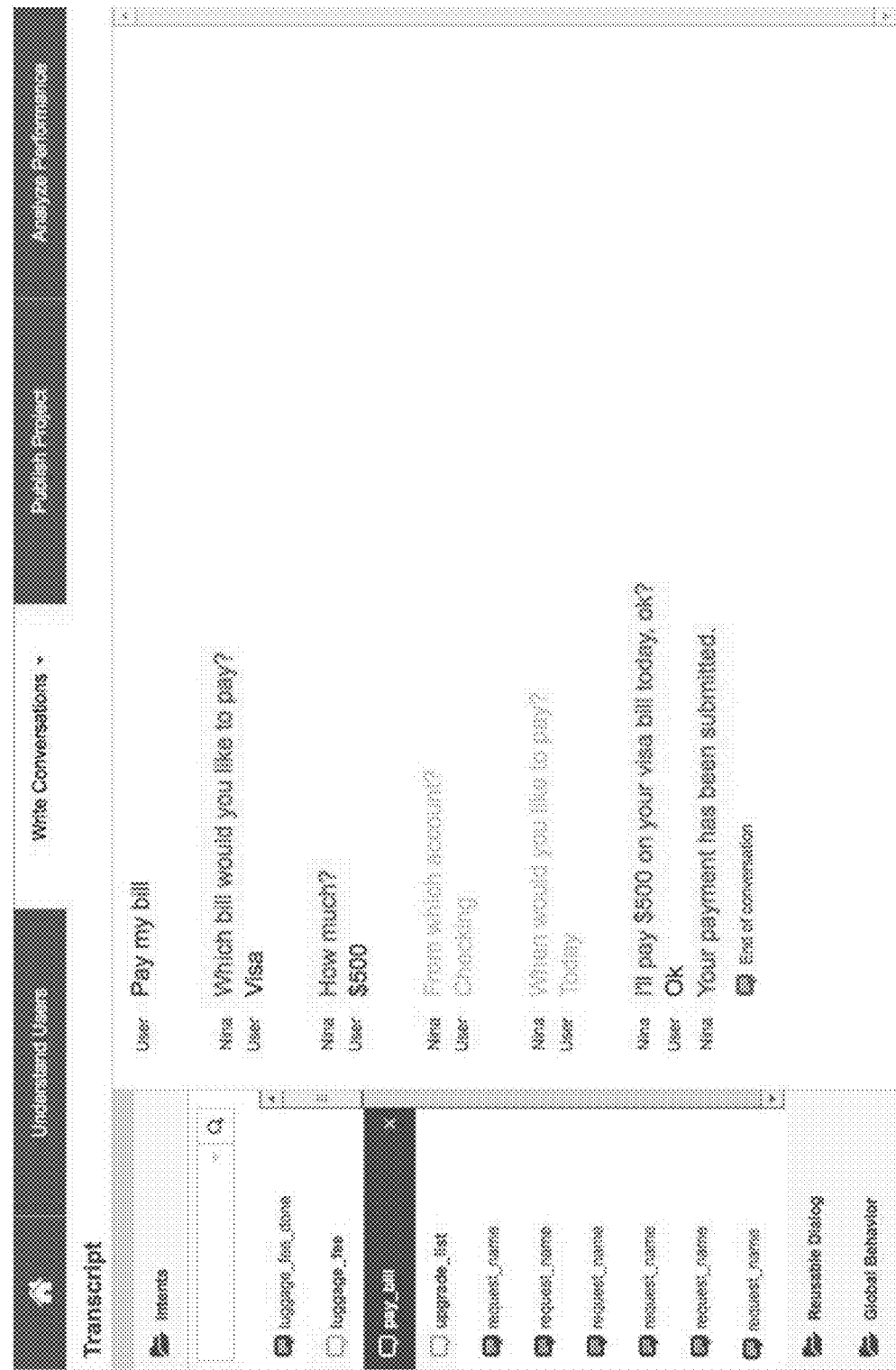
FIGS. 7A-7D depict illustrative screens of a user interface that displays current variable values to easily allow testing of a natural-language system in accordance with one or more example embodiments.

FIG. 7A shows screen 702 that displays an example transcript that a development system may display to a user of an interaction between a user and the system. The user may ask a natural-language system (e.g., a virtual assistant) for assistance in performing a task (e.g., book a flight, pay a bill, provide some information, make an appointment, get directions to a place, etc.). In the example in FIG. 7A, the user may be asking a virtual assistant for help paying the user's credit card bill.

One or more initial prompts from the user may provide information to the system about the user's desired task. For example, the user may tell the system that the user wants to "Pay my bill." The user may give a command that provides more or less information about what the user wants the system to do (e.g., "Pay my credit card bill," "pay $500 on my credit card bill," etc.).

The system may use a number of pieces of information to pay the user's bill (e.g., what bill to pay, how much the user would like to pay, what account the user would like to use to pay the bill, when the user would like to pay the bill, etc.). After gathering sufficient information, the system may ask the user for confirmation to perform the action.

Figure 7B:
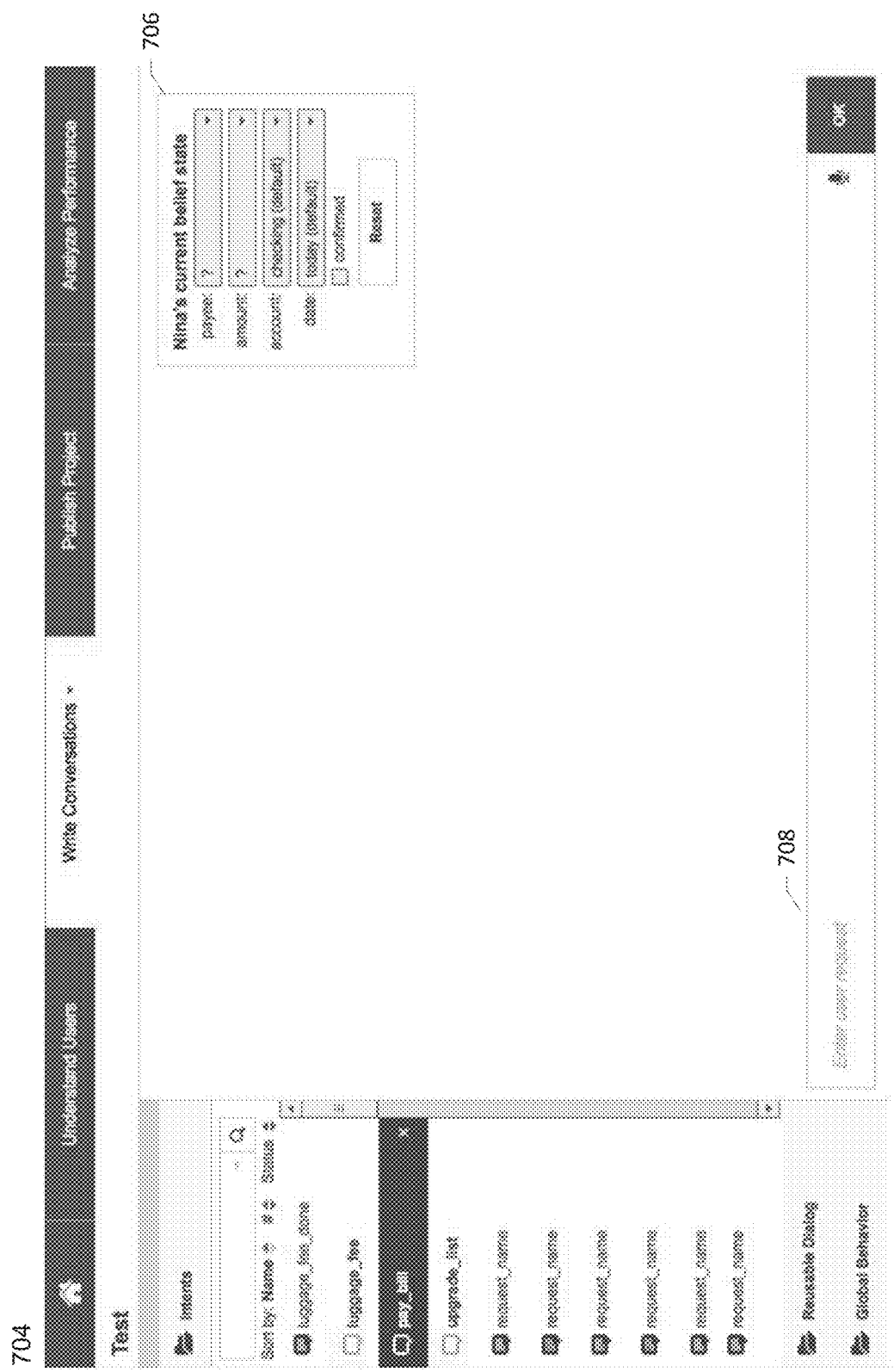

FIG. 7B shows an example test screen 704 for testing interaction between a user and a natural-language system. The interactions between the user and the natural-language system may be connected to the other elements of the system described herein. For example, the natural-language system may perform actions associated with intents defined in other parts of the system (e.g., described in connection with FIGS. 3A-3D or FIGS. 5A-5H).

In a testing mode, the user interface may display a portion 706 of the screen 704 that shows a state of one or more variables of the natural-language system (e.g., a current belief state). The variables displayed may be variables associated with a particular intent selected (e.g., from a list of intents associated with the system). Portion 706 of the user interface may allow a user to set a variable to a particular value, clear a value stored in a variable, reset the variables to their default state, or otherwise manipulate the variables.

One or more variables may have default values. A system might not ask a user to provide information for variables with default values, but may set the variables to be the default or something different than the default if the user provides information corresponding to those variables.

In the example depicted in FIG. 7B, the selected intent may be "pay_bill," which may be associated with a virtual assistant function of paying a bill. In order to perform a function, the system may need to know certain information. For example, to pay a bill, the system may need to know who the payee is, an amount to pay, an account to pay from, and a date to pay. The information that the system uses may depend on the function the system is to perform. Each intent may have one or more variables associated with the intent, where each variable represents a piece of information that the system uses in order to perform the function associated with that intent.

Figure 7C:
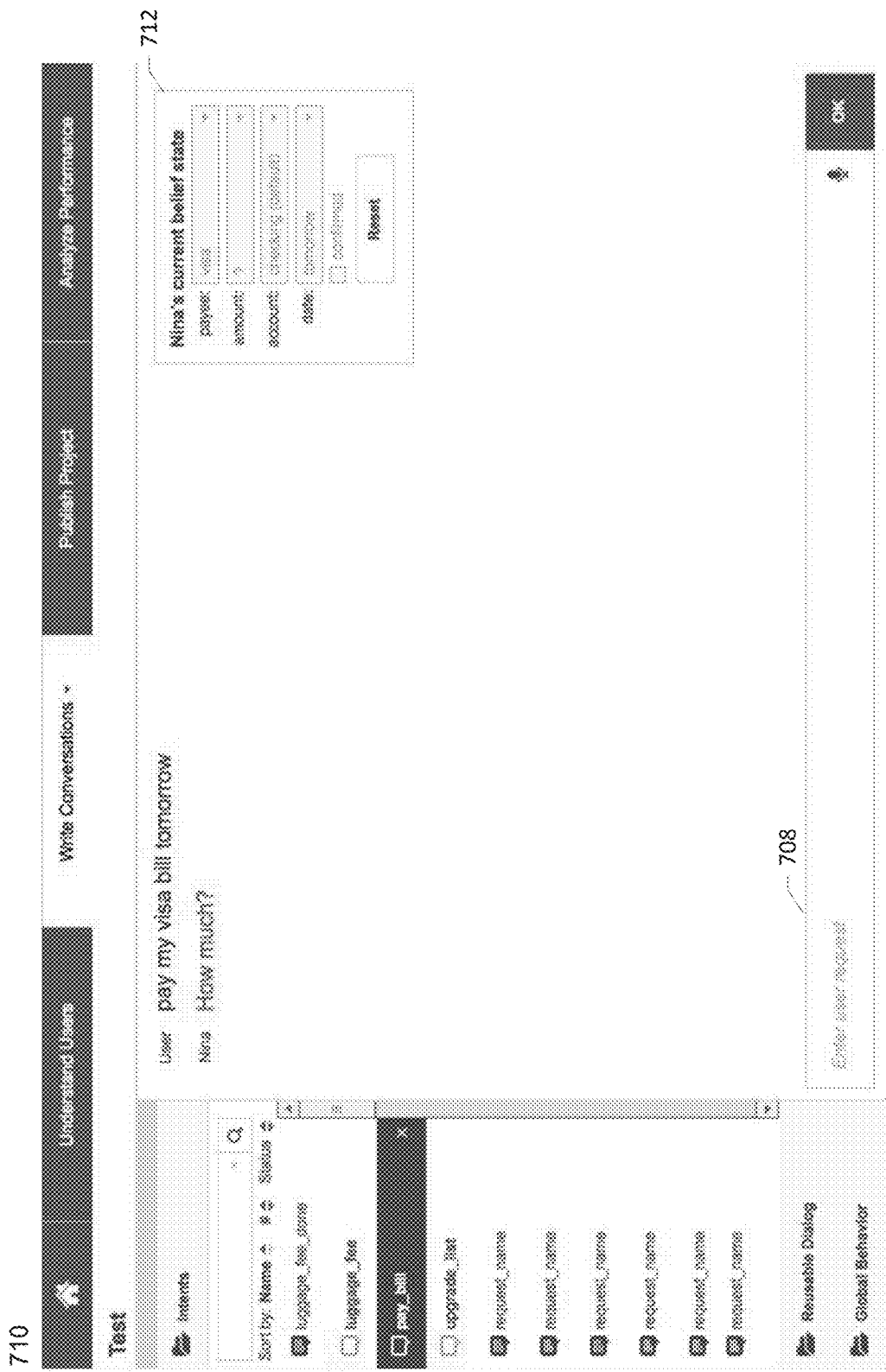

As shown in screen 710 of FIG. 7C, the system may allow a user to test functionality of a natural-language system with a visual representation of the current variable state. The user may enter sentences that a hypothetical user may say or provide in one part 708 of the user interface. The system may display the complete dialog between the hypothetical user and the system in a chat transcript format. The system may display in portion 712 the current state of one or more variables associated with the intent or function that the user asks the system to perform. The current state of the variables displayed in portion 712 may be different than the current state of the variables displayed in portion 706 based on the information the system received from the hypothetical user (e.g., the information displayed in the chat transcript).

The system may automatically detect the function that the hypothetical user wants to perform based on one or more phrases (e.g., the initial user request) entered by the user. For example, if the initial user request is "pay my visa bill tomorrow," the system may determine that the user is testing the "pay_bill" intent, and respond according to the function associated with paying a bill. In another embodiment, the user may select an intent to test, and the system may respond according to the function associated with the intent selected by the user.

The system may automatically update the variables associated with the function being performed, based on the information provided by the hypothetical user in the interactions between the hypothetical user and the system. For example, in FIG. 7C, the user said, "pay my visa bill tomorrow." Therefore, the system may determine that the bill payee is "visa," and the date is "tomorrow," as displayed in the portion of the user interface displaying the current belief state. The system might not, however, know how much to pay. The system also might not know what account to pay from, although in the depicted example, the system may have a default value for the account to pay from. In some embodiments, if the system has a default value for a variable, the system might not prompt the hypothetical user to provide a value for the variable, but may use a provided value if the hypothetical user provides a value.

The system may ask the hypothetical user for a value for each of the variables that the system does not yet have a value for. For example, in FIG. 7C, after the hypothetical user said, "pay my visa bill tomorrow," the system may determine that the payee is "visa." The system may still not know how much to pay, so the system may ask, "How much?"

Figure 7D:
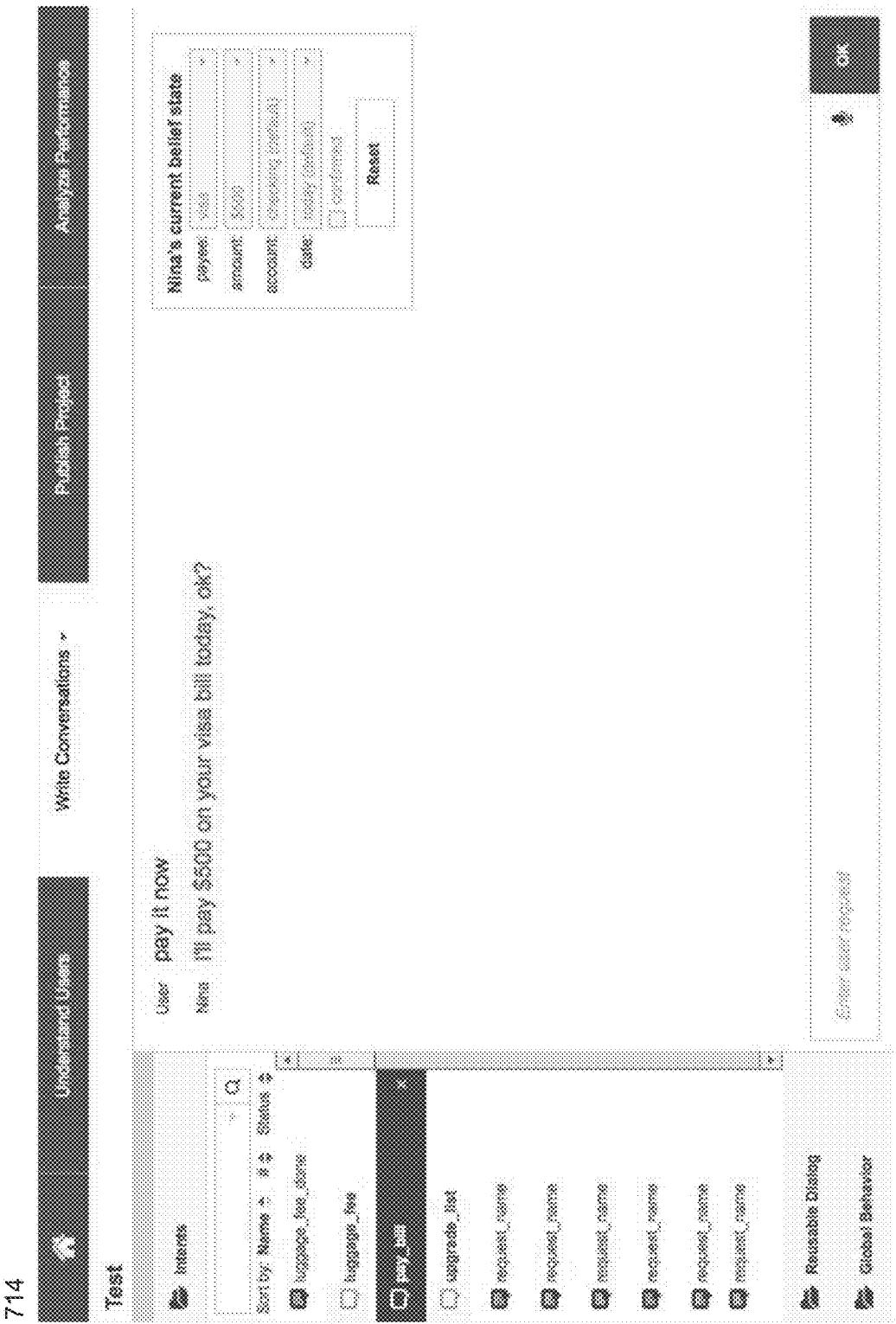

As shown in screen 714 of FIG. 7D, once the system has values for all the variables needed to perform a task associated with a particular intent, the system may confirm with the hypothetical user the details of the task that the system will perform. In the illustrated example, the system may already have values for each of the variables associated with performing the task of paying a bill. Therefore, when the hypothetical user says "pay it now," the system might not need to ask for any further information. The system may confirm the details of the task the system plans to perform by saying, "I'll pay $500 on your visa bill today, ok?"

Figure 8:
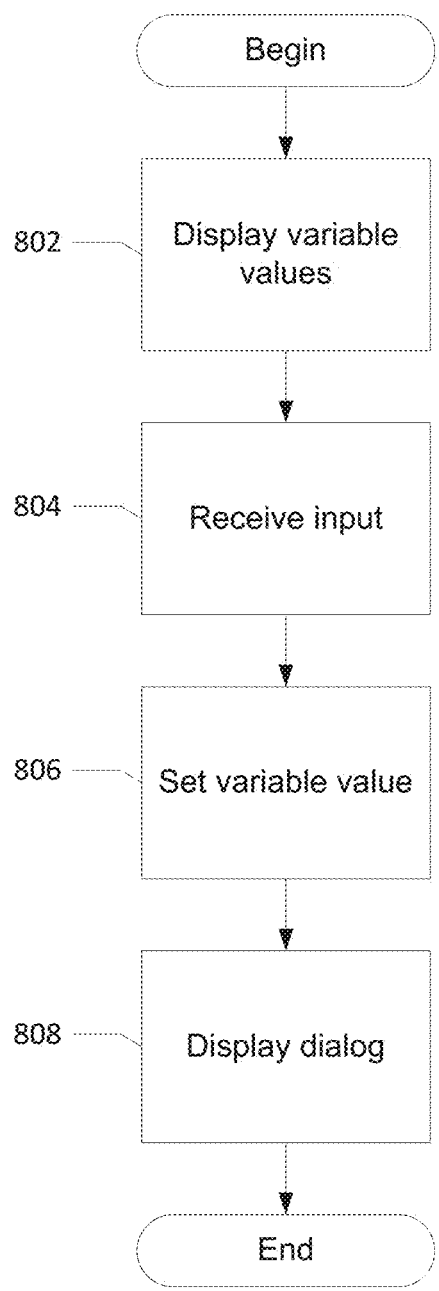
FIG. 8 depicts an illustrative flow diagram of a method for displaying current variable values to easily allow testing of a natural-language system in accordance with one or more example embodiments.

FIG. 8 shows an illustrative system flow diagram for a system for testing a dialog between a user and a virtual assistant.

In step 802, a system may display a testing interface including a graphical representation of one or more variables associated with a particular function of a virtual assistant.

In step 804, the system may receive input including a value for at least one of the one or more variables associated with the particular function of the virtual assistant.

In step 806, the system may set the at least one variable to the value from the input.

In step 808, the system may display a visual representation of a hypothetical dialog between a user and the virtual assistant. The testing interface may use the values of the plurality of variables in determining questions and responses to give the user in the hypothetical dialog. In some embodiments, the visual representation of the hypothetical dialog between the user and the virtual assistant may include a display of a transcript of a single potential path through a tree (e.g., a tree that includes one or more discussions between the virtual assistant and the user). In some embodiments, the single potential path through the tree may be determined based on the value of the at least one of the plurality of variables associated with the particular function of the virtual assistant. In some embodiments, the next node of a node may be selected by choosing a branch from the node where the branch is associated with a particular value of least one of the plurality of variables associated with the particular function of the virtual assistant.

In some embodiments, the system may receive, from a user of the testing interface, input including a user response, and determine, based on the input including the user response, one or more questions and responses.

In some embodiments, the system may call a running of the virtual assistant, provide the virtual assistant with a plurality of values of the plurality of variables, provide the virtual assistant with one or more hypothetical user responses, and receive, from the virtual assistant, the questions to give the user in the hypothetical dialog.

In some embodiments, the system may simulate running the virtual assistant, and receive from the simulated miming virtual assistant the questions to ask the user in the hypothetical dialog.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A non-transitory computer-readable medium storing computer readable instructions that, when executed by a processor, cause a device to:
provide a user interface for a virtual-assistant development system, the user interface comprising:
a first display area of the user interface for the virtual-assistant development system, the first display area configured to display a list of two or more intents, wherein each intent of the two or more intents is associated with a different process that can be performed by a language-processing system;
a second display area of the user interface for the virtual-assistant development system, the second display area configured to display a list of request strings, wherein the list of request strings is automatically updated, responsive to a selection of an intent from the list of two or more intents in the first display area, to include one or more request strings associated with the selected intent, wherein the first display area and the second display area are concurrently displayed on the user interface; and
a third display area of the user interface for the virtual-assistant development system, the third display area configured to:
display visual indicators of one or more concept tags respectively corresponding to one or more concepts respectively associated with one or more associated words in a request string of the list of request strings in the second display area, wherein the request string is associated with the selected intent, and
receive input associating one or more unassociated words in the request string with one or more concepts associated with the selected intent;
receive a new request string not currently in the list of request strings;
suggest an intent of the list of two or more intents to associate with the new request string;
suggest one or more concept tags respectively corresponding to one or more concepts to respectively associate with one or more words in the new request string, wherein the one or more concepts are associated with the suggested intent; and
display, via the user interface, the new request string, the suggested intent, and the suggested one or more concept tags.

2. The non-transitory computer-readable medium of claim 1, wherein the user interface comprises:
a fourth display area of the user interface for the virtual-assistant development system, the fourth display area configured to receive the request string, display the intent associated with the request string, and display visual indicators of one or more second concept tags respectively associated with one or more second concepts respectively associated with one or more words in the request string, wherein the one or more second concepts are associated with the intent associated with the request string.

3. The non-transitory computer-readable medium of claim 2, wherein the fourth display area is configured to automatically update the one or more concept tags in the fourth display area responsive to receiving input indicating a user-added association between a different intent and the request string.

4. The non-transitory computer-readable medium of claim 1, wherein the third display area is configured to automatically display a new concept in a list of concepts associated with the selected intent responsive to receiving input adding the new concept to the one or more concepts associated with the selected intent.

5. The non-transitory computer-readable medium of claim 1, storing computer-readable instructions that, when executed by the processor, cause the device to:
receive validation of the suggested intent; and
associate the new request string with the suggested intent.

6. The non-transitory computer-readable medium of claim 1, storing computer-readable instructions that, when executed by the processor, cause the device to:
receive validation of the suggested one or more concept tags; and
associate the suggested one or more concept tags respectively corresponding to the one or more concepts with the one or more words in the new request string.

7. The non-transitory computer-readable medium of claim 1, storing computer-readable instructions that, when executed by the processor, cause the device to:
generate a grammar using the request strings, the two or more intents, and the one or more concepts,
wherein suggesting the intent of the list of two or more intents to associate with the new request string is based on the grammar, and
wherein suggesting the one or more concept tags respectively corresponding to the one or more concepts to respectively associate with the one or more words in the new request string is based on the grammar.

8. The non-transitory computer-readable medium of claim 1, storing computer-readable instructions that, when executed by the processor, cause the device to:
dissociate the request string of the list of request strings from the selected intent in response to one or more inputs received from a user of the user interface; and
associate the request string with a different intent than the selected intent in response to the one or more inputs received from the user.

* * * * *